(12) United States Patent
Ashizawa et al.

(10) Patent No.: US 7,317,978 B2
(45) Date of Patent: Jan. 8, 2008

(54) DRIVING FORCE CONTROL APPARATUS FOR VEHICLE

(75) Inventors: Hiroyuki Ashizawa, Yokohama (JP); Jicheng Zhang, Fujisawa (JP); Hideo Nakamura, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 591 days.

(21) Appl. No.: 10/930,838

(22) Filed: Sep. 1, 2004

(65) Prior Publication Data

US 2005/0065690 A1  Mar. 24, 2005

(30) Foreign Application Priority Data

Sep. 5, 2003 (JP) ............................. 2003-314246
Apr. 27, 2004 (JP) ............................. 2004-131446

(51) Int. Cl.
G06F 17/00 (2006.01)
G06F 19/00 (2006.01)
G06F 7/00 (2006.01)

(52) U.S. Cl. ............................ 701/54; 701/51; 701/70

(58) Field of Classification Search .................. 701/54, 701/51, 70, 84; 303/112; 475/195; 320/132
See application file for complete search history.

(56) References Cited

U.S. PATENT DOCUMENTS 3,350,548 A * 10/1967 Whitaker ...................... 700/30
3,489,018 A * 1/1970 Slivka ......................... 74/5.42
4,422,988 A * 12/1983 Kornylak .................... 264/40.3
5,001,636 A * 3/1991 Shiraishi et al. ............. 701/41
5,016,175 A * 5/1991 Baltusis et al. .............. 701/58
5,166,879 A * 11/1992 Greene et al. ................ 701/62
5,282,424 A * 2/1994 O'Neill ........................ 104/282

(Continued)

FOREIGN PATENT DOCUMENTS

JP    10-227231 A    8/1998

(Continued)

OTHER PUBLICATIONS

H. A. Toliyat et al., A review of RFO induction motor parameter estimation techniques—Energy Conversion, IEEE Transactions on; vol. 18, Issue 2, Jun. 2003 pp. 271-283—Digital Object Identifier 10.1109/TEC.2003.811719.*

(Continued)

Primary Examiner—Cuong Nguyen
(74) Attorney, Agent, or Firm—Foley & Lardner LLP

(57) ABSTRACT

A driving force control apparatus for a vehicle includes a first sensor that detects an output command supplied to a power source, a second sensor that detects an operating condition amount of a vehicle and a controller. The controller calculates a basic command value of an output of the power source based upon the output command from the first sensor, calculates a reference model command value based upon the basic command value and transmission characteristic of a response of reference model, calculates a correction value from a deviation between the reference model command value and a predetermined frequency component corresponding to a vibration of a vehicle driving system extracted out of the operating condition amount of the vehicle, and calculates a target command value based upon the basic command value and the correction value to control the torque of the power source.

22 Claims, 26 Drawing Sheets

U.S. PATENT DOCUMENTS

| | | | | |
|---|---|---|---|---|
| 5,333,058 | A * | 7/1994 | Shiraishi et al. | 701/72 |
| 5,433,155 | A * | 7/1995 | O'Neill et al. | 104/282 |
| 5,606,950 | A * | 3/1997 | Fujiwara et al. | 123/399 |
| 6,087,734 | A * | 7/2000 | Maeda et al. | 290/40 C |
| 6,244,674 | B1 * | 6/2001 | Kuno et al. | 303/152 |
| 6,282,478 | B1 * | 8/2001 | Akita | 701/70 |
| 6,571,176 | B1 * | 5/2003 | Shinmura et al. | 701/301 |
| 6,813,553 | B2 * | 11/2004 | Nakamura et al. | 701/70 |
| 6,974,009 | B2 * | 12/2005 | Hoshiya et al. | 192/3.63 |
| 7,006,906 | B2 * | 2/2006 | Kobayashi et al. | 701/22 |
| 7,092,811 | B2 * | 8/2006 | Ishizu et al. | 701/93 |
| 7,188,717 | B2 * | 3/2007 | Hoshiya et al. | 192/3.63 |
| 2001/0044691 | A1 * | 11/2001 | Ishizu et al. | 701/93 |
| 2003/0150683 | A1 * | 8/2003 | Hoshiya et al. | 192/3.57 |
| 2004/0093144 | A1 * | 5/2004 | Ishizu et al. | 701/93 |
| 2004/0215385 | A1 * | 10/2004 | Aizawa et al. | 701/93 |
| 2005/0075766 | A1 * | 4/2005 | Kobayashi et al. | 701/22 |
| 2005/0197233 | A1 * | 9/2005 | Hoshiya et al. | 477/39 |
| 2006/0259225 | A1 * | 11/2006 | Ono et al. | 701/82 |
| 2007/0010945 | A1 * | 1/2007 | Shoda et al. | 701/301 |
| 2007/0029973 | A1 * | 2/2007 | Ashizawa et al. | 320/132 |

FOREIGN PATENT DOCUMENTS

| | | | |
|---|---|---|---|
| JP | 2002-171778 A | | 6/2002 |
| JP | 2004360475 A | * | 12/2004 |
| JP | 2005102492 A | * | 4/2005 |
| JP | 2005318676 A | * | 11/2005 |

OTHER PUBLICATIONS

C. S. Tzafestas, Whole-hand kinesthetic feedback and haptic perception in dextrous virtual manipulation; Systems, Man and Cybernetics, Part A, IEEE Transactions on; vol. 33, Issue 1, Jan. 2003 pp. 100-113—Digital Object Identifier 10.1109/TSMCA.2003.812600.*

R. Isermann, Modeling and design methodology for mechatronic systems, Mechatronics, IEEE/ASME Transactions on; vol. 1, Issue 1, Mar. 1996 pp. 16-28; Digital Object Identifier 10.1109/3516.491406.*

A. Consoli et al., Sensorless torque control of SyncRel motor drives; Power Electronics, IEEE Transactions on; vol. 15, Issue 1, Jan. 2000 pp. 28-35; Digital Object Identifier 10.1109/63.817359.*

P. Cheung et al., Design, fabrication, position sensing, and control of an electrostatically-driven polysilicon microactuator; Magnetics, IEEE Transactions on; vol. 32, Issue 1, Jan. 1996 pp. 122-128 ; Digital Object Identifier 10.1109/20.477561.*

M. Fleischer, Parameter estimation for traction drive-trains; Power Electronics and Applications, 2005 European Conference on Sep. 11-14, 2005 p. 6 pp.*

Y. Fujiwara et al., Control design of driver support system using multiple driver models; SICE 2004 Annual Conference vol. 3, Aug. 4-6, 2004 pp. 2443-2448 vol. 3.*

S. Kumarawadu et al., Exponentially Stabilizing Output Tracking of Fully Autonomous Passenger Cars with an Observer; Networking, Sensing and Control, 2006. ICNSC '06. Proceedings of the 2006 IEEE International Conference on; Apr. 23-25, 2006 pp. 562-567.*

Tsing-Yee Tu et al., The preliminary design for high speed ground levitation vehicle—Single side short secondary—Computer aided calculation for the optimal impedance and active force; Vehicular Technology Conference, 1987. 37th IEEE vol. 37, Jun. 1-3, 1987 pp. 222-230.*

U. Kiencke, A view of automotive control systems; Control Systems Magazine, IEEE vol. 8, Issue 4, Aug. 1988 pp. 11-19; Digital Object Identifier 10.1109/37.7725.*

S. Kumarawadu et al., Exponentially Stabilizing Output Tracking of Fully Autonomous Passenger Cars with an Observer; Networking, Sensing and Control, 2006. ICNSC '06. Proceedings of the 2006 IEEE International Conference on; Apr. 23-25, 2006 pp. 562-567.*

* cited by examiner

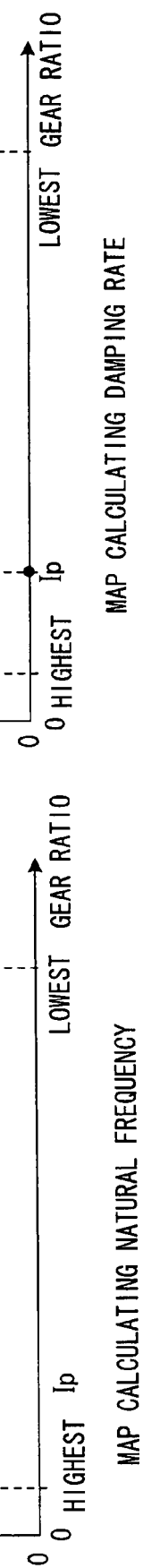
FIG. 4
FIG. 5

FIG. 11
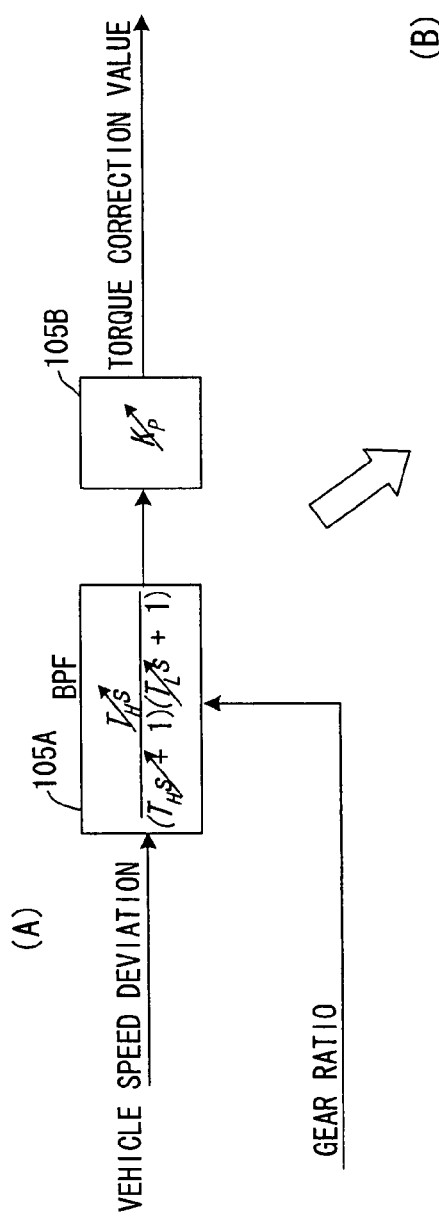
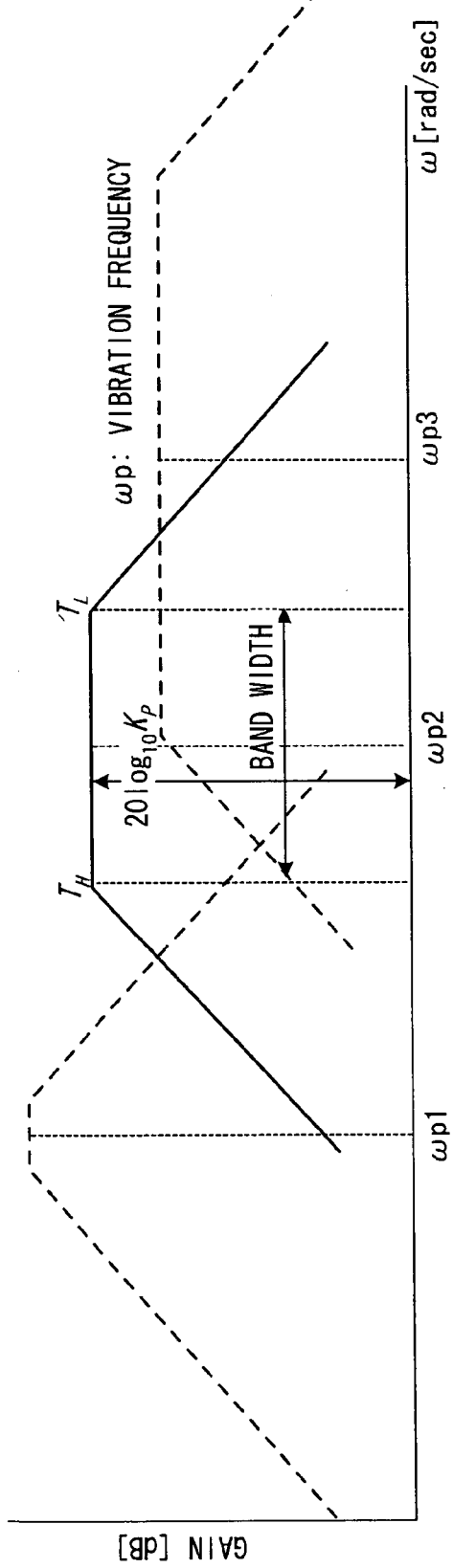

DRIVING FORCE CONTROL APPARATUS FOR VEHICLE

TECHNICAL FIELD

The present invention relates to an improvement of a driving force control apparatus for vibration restriction of a vehicle.

BACKGROUND INFORMATION

Vibrations of a drive system for a vehicle tend to be generated due to a torsion of a drive shaft of the drive system caused by a change in torque of a driving source such as a motor or an engine mounted on the vehicle. Japanese Unexamined Patent Publication No. 2002-171778A has proposed a technique to restrict the vibrations in such drive system.

SUMMARY OF THE INVENTION

The above technique has disclosed a proportional/differential (referred to as PD hereinafter) control for achieving a target torque of a vehicle where a rotation speed in a predetermined frequency band of a motor as a vibration frequency component of a vehicle drive system is feedback-controlled to remove this vibration frequency component. The PD control has the purpose of establishing both a response of a reference model as a transient response characteristic and stability as a follow-up performance to a target value.

In this case, however, when both of the response of the reference model and the stability are designed to be achieved with one single PD compensation device, for instance, in the event of changing the response of the reference model, the PD compensation device has to be redesigned, taking into account an impact of changing the response thereof on the stability, which causes deterioration of a development efficiency.

The present invention, from the foregoing problems, has an object of providing a driving force control apparatus for a vehicle that independently controls a compensation for a response of a reference model and a compensation for stability when vibrations for a vehicle are controlled to be restricted.

According to one aspect of the present invention, a driving force control apparatus for a vehicle is provided with at least one power source and a drive mechanism that transmits to a driving wheel a torque to be outputted from the one power source, wherein the driving force control apparatus includes a first sensor that detects an output command supplied to the one power source, a second sensor that detects an operating condition amount of a vehicle and a controller that controls the torque of the one power source. The controller is programmed to calculate a basic command value of an output of the one power source based upon the output command to the one power source for the vehicle, calculate a reference model command value based upon the basic command value and a transmission characteristic of a response of reference model, calculate a correction value from a deviation between the reference model command value and a predetermined frequency component corresponding to a vibration of a vehicle driving system extracted out of the operating condition amount of the vehicle, and calculate a target command value based upon the basic command value and the correction value, to control the output of the one power source based upon the target command value.

These and other objects, features, aspects and advantages of the present invention will become apparent to those skilled in the art from the following detailed description, which, taken in conjunction with the annexed drawings, discloses a preferred embodiments of the present invention.

BRIEF EXPLANATION OF THE DRAWINGS

FIG. 4 is a map of a natural frequency in response to a gear ratio.

FIG. 5 is a map of a damping rate in response to a gear ratio.

FIG. 11 is an explanation view pf a part of the control block diagram and a band pass filter, wherein FIG. 11(A) shows a part of the control block diagram and FIG. 11(B) shows a relation between a frequency and a gain.

THE PREFERRED EMBODIMENTS OF THE INVENTION

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

A first embodiment according to the present invention will be explained with reference to accompanying drawings.

Figure 1:
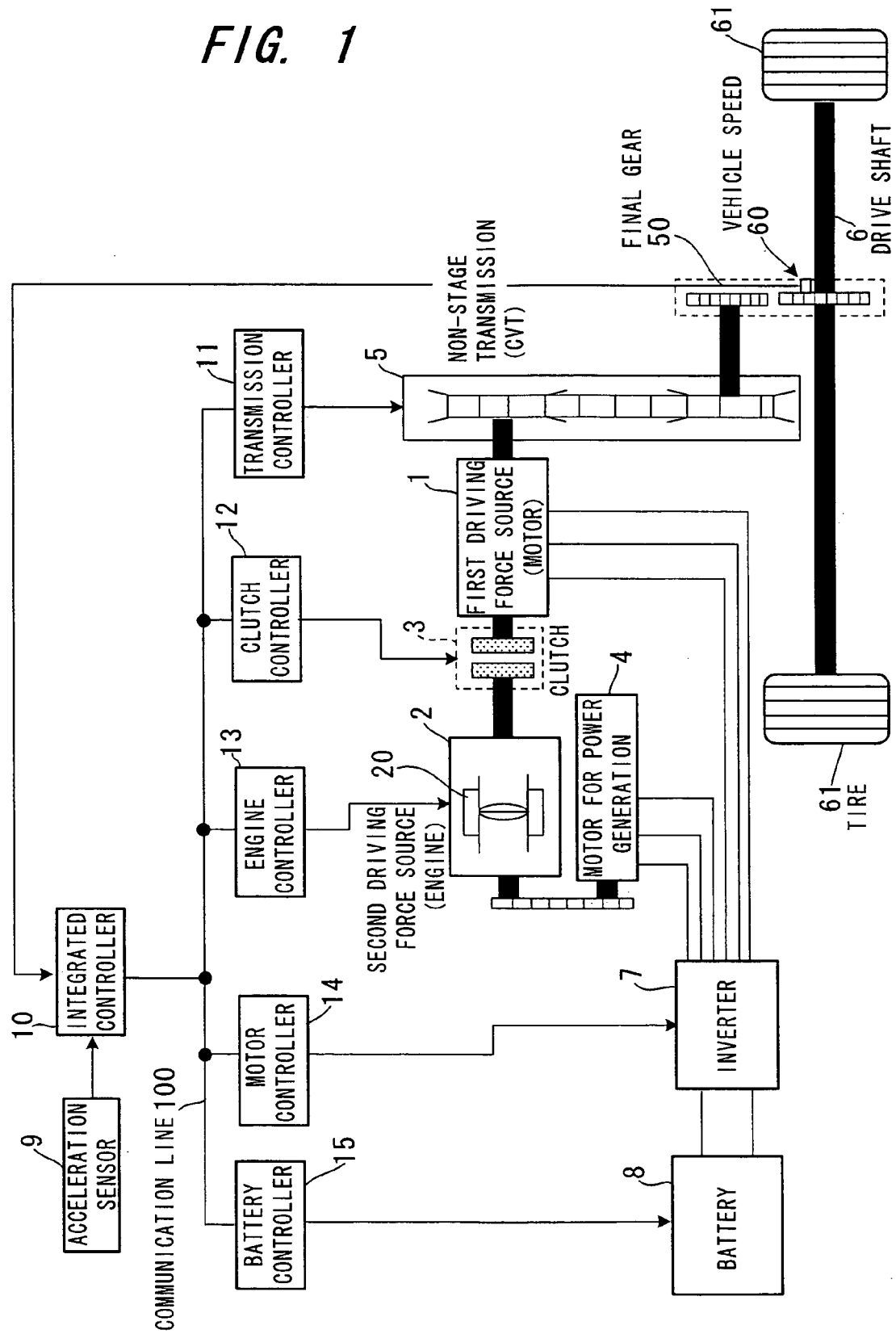
FIG. 1 is a schematic view of a drive system for a vehicle of a first embodiment according to the present invention.

FIG. 1 shows an embodiment of a hybrid vehicle to which the present invention is applied where, for instance, a series/parallel hybrid vehicle is shown.

The hybrid vehicle is equipped with, as drive sources, an alternating current synchronous motor 1 that is a first drive source and an engine 2 that is a second drive source. The engine 2 is arranged in series with the motor 1 through an electromagnetic clutch 3. A non-stage transmission 5 is disposed in an output side of the alternating current synchronous motor 1 and then a drive shaft 6 and tires 61 are connected to the non-stage transmission 5 through a final gear 50.

The engine 2 is always connected to and drives a motor (motor generator) 4 for power generation.

There is provided a clutch controller 12 that controls the electromagnetic clutch 3. When the electromagnetic clutch 3 to be controlled by the clutch controller 12 is in an engagement condition, a vehicle is driven by the engine 2 and the motor 1 as a parallel hybrid vehicle and when the electromagnetic clutch 3 is in a disengagement condition, the motor 1 is driven as a series hybrid by electric power from the motor 4 to be driven by the engine 2.

The alternating current synchronous motor 1 generates a driving torque to drive the vehicle and utilizes kinetic energies of the vehicle during the traveling thereof to generate power during the braking (energy regenerative) and charge a battery 8. For these controls a motor controller 14 is provided.

Further, the motor controller 14 drives the motors 1, 4 through an inverter 7 of a high voltage or controls the energy regenerative.

The engine 2 operates in a lean burning and is equipped with an engine controller 13 to control an output thereof. The engine controller 13 controls an intake air quantity by a throttle actuator 20, a fuel injection quantity by an injector (not shown), and an ignition timing by an ignition plug (not shown) to control an engine torque to be in accordance with a command value.

The motor controller 14 controls the power generation motor 4 and converts an engine output torque into an electrical energy corresponding to a charge condition of the battery 8 during a traveling mode of the above-described series hybrid and charges the battery 8 through the inverter 7.

A transmission controller 11 is provide for controlling the non-stage transmission 5 and controls a gear ratio thereof to be in accordance with a command value by changing radii of a primary pulley 5p and a secondary pulley 5s.

The battery 8 is a high voltage battery, is checked and controlled by the battery controller 15 and accumulates regenerative energies from the alternating current synchronous motor 1 or electrical energies that the power generation motor 4 generates.

The transmission controller 11, the clutch controller 12, the engine controller 13, the motor controller 14, and the battery controller 15 are respectively connected through a communication line 100 to the integrated controller 10, which perform respective controls based upon commands from the integrated controller 10.

The integrated controller 10 formed of a microcomputer calculates a driving torque command value as needed of a vehicle based upon an operating condition such as a charge condition of the battery 8, an operation amount APO of the accelerator, or a vehicle speed VSP. And a torque command value to each of the motor 1 and the engine 2 and a gear ratio command value of the non-stage transmission 5 are sent to each controller based upon the calculation result. And an engagement condition of the electromagnetic clutch 3 is determined from the charge condition of the battery 8 and the vehicle speed, which is sent to the clutch controller 12.

An acceleration sensor 9 that detects an operation amount (an opening angle of an accelerator) of an acceleration pedal and a vehicle speed sensor 6 that detects a vehicle speed are connected to the integrated controller 10 and a detection value of each sensor is inputted thereto.

The transmission controller 11 controls the non-stage transmission 5 to be in accordance with a gear ratio command value to be outputted from the integrated controller 10 and the clutch controller 12 engages or disengages the electromagnetic clutch 3 by a clutch control signal from the integrated controller 10. The engine controller 13 controls an engine torque to be in accordance with an engine torque command value from the integrated controller 10. The motor controller 14 controls a motor torque to be in accordance with a motor torque command value from the integrated controller 10. The battery controller 15 checks a charge condition of the battery 8 and sends the information to the integrated controller 10.

Figure 2:
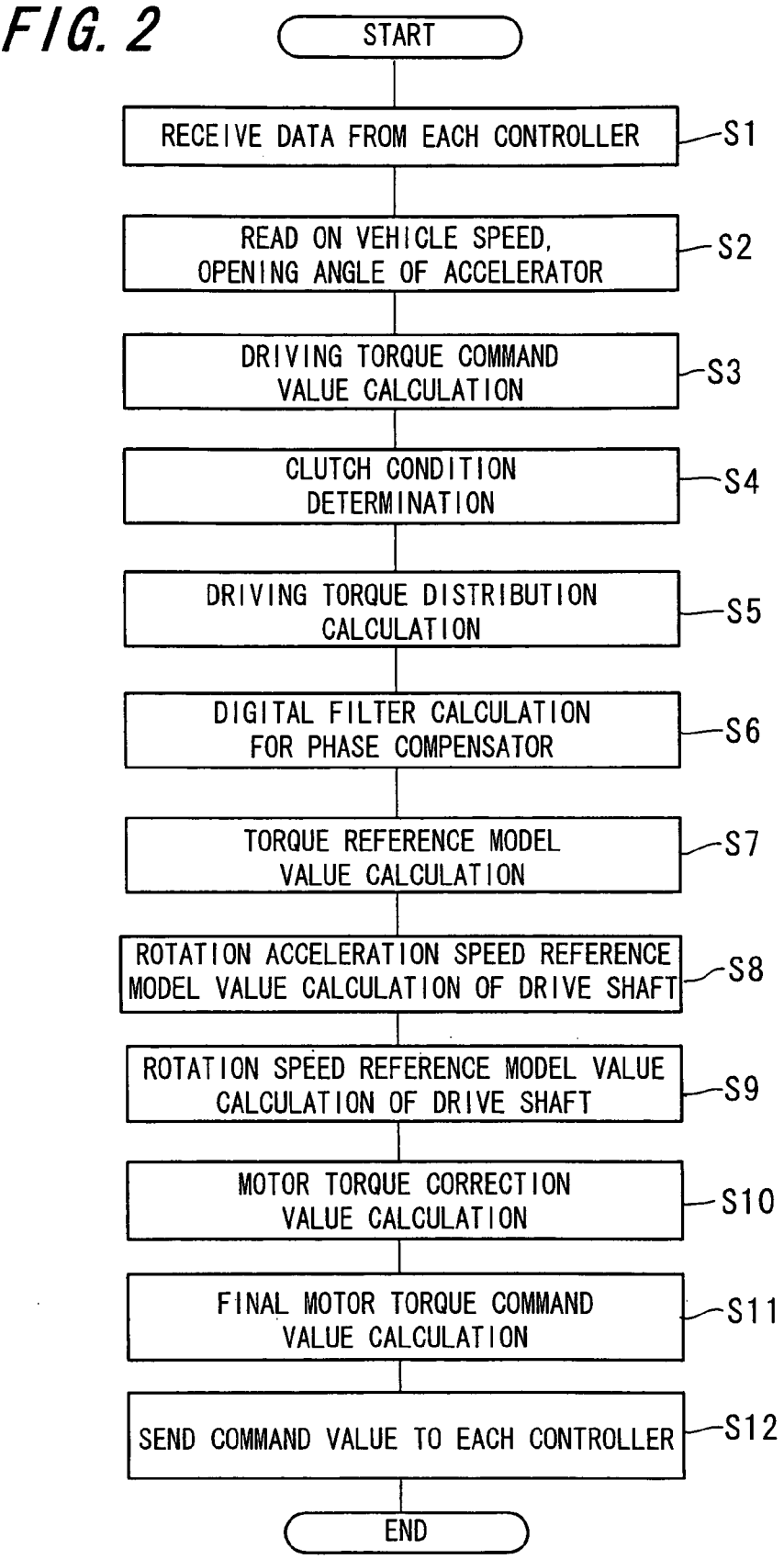
FIG. 2 is a flow chart showing one example of a control that is carried out in an integrated controller.

Next, one example of a control to be performed in the integrated controller 10 will be explained with reference to a flow chart shown in FIG. 2. Herein the process contents shown in FIG. 2 are executed for a predetermined cycle (for instance, several msec).

At Step S1 vehicle condition data from the other controllers 11-15, such as a battery charge amount SOC, a gear ratio Ip of the non-stage transmission and the like are received. At Step S2 an acceleration operation amount APO, a vehicle speed signal VSP, or the like from each sensor is read on.

Figure 3:
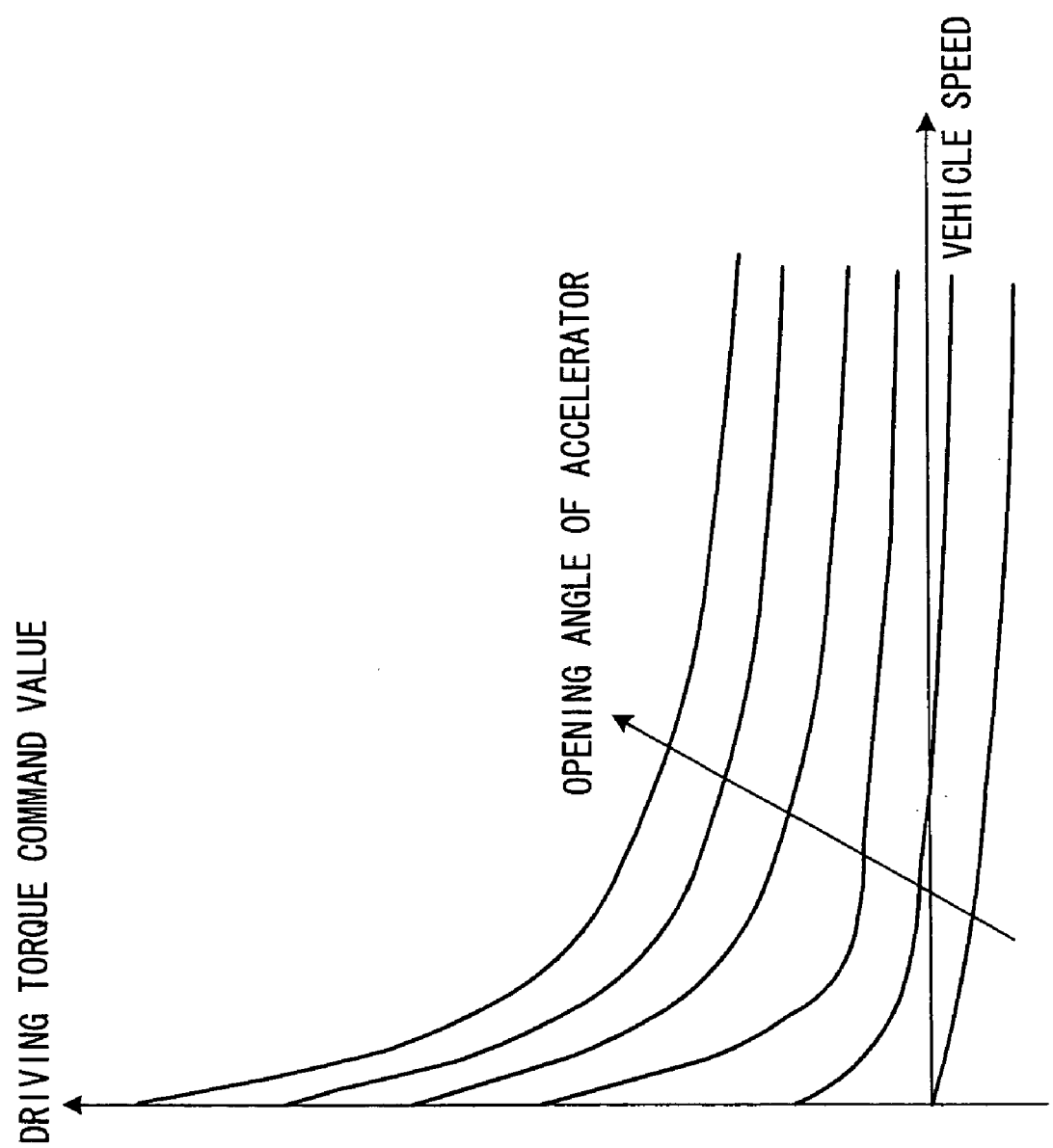
FIG. 3 is a map of a driving torque command value in response to a vehicle speed determined in relation to an opening angle of an accelerator.

At Step S3 a driving torque command value Td* is calculated based upon the acceleration operation amount APO and the vehicle speed VSP. This driving torque command value Td* is calculated from a relationship between an acceleration operation amount (an opening angle of the accelerator in FIG. 3) and a vehicle speed based upon, for instance, a map as shown in FIG. 3.

At Step S4 a clutch control signal CLsig for determining a condition of the electromagnetic clutch 3 is calculated based upon a vehicle condition amount such as a battery charge amount SOC and a vehicle speed VSP. In case the vehicle speed VSP exceeds a predetermined value, or the battery charge amount SOC is lowered, the clutch control signal CLsig is set to engage the electromagnetic clutch 3 to drive a vehicle by the engine 2, as well as the engine 2 drives a motor 4 to charge the battery 8. On the other hand, in case the vehicle speed VSP is less than a predetermined value and the battery charge amount SOC is sufficient, the clutch control signal CLsig adapted to disengage the electromagnetic clutch 3 is set to drive a vehicle by the alternating current synchronous motor 1.

At Step S5 a distribution ratio in a driving torque of the engine 2 to that of the alternating current synchronous motor 1 is determined to distribute the driving torque command value Td* as the engine torque command value Te* and the motor torque command value Tm*. The driving torque command value Td* can be distributed based upon, for instance, a vehicle speed VSP or a battery charge amount SOC.

At Step S6 a phase compensation is made to a motor torque command value Tm* based upon a phase compensation filter W(s) shown in the following equation (1), to calculate F/F motor torque command value Tm_FF.

$$W_S = \frac{Gm(s)}{Gp(s)} = \frac{\omega_m^2(s^2 + 2\xi_p\omega_p s + \omega_p^2)}{\omega_p^2(s^2 + 2\xi_m\omega_m s + \omega_m^2)}, \quad (1)$$

wherein
Gp (s): Transmission Function of Drive Shaft Torque in response to an Operation Amount of an Accelerator
Gm (s): Response of Reference Model of Driving Torque
ωp: Natural Frequency of Self-Vehicle
ωm: Natural frequency of Target Vehicle
ξp: Damping Coefficient of Self-Vehicle
ξm: Damping Coefficient of Target Vehicle
s: Laplace Operator.

And calculations of Gp(s) and Gm(s) can be carried out in the same way with Japanese Unexamined Patent Publication No. 10-227231A.

Each constant of the phase compensation filter is determined based upon a gear ratio Ip of a non-stage transmission by using a map shown in FIG. 4 or 5.

FIG. 4 shows a map of a natural frequency ω of a vehicle in response to a gear ratio Ip and FIG. 5 shows a map of a damping coefficient ξ of a vehicle in response to a gear ratio Ip. An actual calculation is made by using a recurrence formula obtained based upon the digitizing by Tustin approximate calculation or the like.

Next, at Steps S7-S9, a calculation process of a motor torque correction value of an alternating current synchronous motor 1 will be explained.

At Step S7 a torque reference model value is calculated. In detail a torque reference model value Tm_ref is calculated based upon the following equation as an input of an input torque command value Tm* of the alternating current synchronous motor 1.

$$\frac{Tm\_ref}{Tm^*} = G_m(s) = \frac{\omega_m^2}{s^2 + 2\xi_m\omega_m s + \omega_m^2}, \quad (2)$$

wherein
τm: Time Constant of Response of Reference Model [sec]

In fact, the torque reference model value Tm_ref is calculated by using the recurrence formula obtained based upon the digitizing by Tustin approximate formula or the like in the same as the above-described.

At Step S8, a rotation acceleration speed αωd_ref of a drive shaft of a vehicle is calculated based upon the following equation (3) from the torque reference model value Tm_ref and the gear ratio Ip.

$$\alpha\,\omega\,d\_ref = \frac{Ip \times If}{M \times Ra^2} T\,m\,e\_ref, \quad (3)$$

wherein
M: Vehicle Mass  Ra: Tire Radius
I f: Final Reduction Ratio.

At Step S9 a rotation speed reference model value of a drive shaft ωd_ref is calculated by integrating a rotation acceleration speed reference model of a drive shaft αωd_ref as shown in the following equation (4). An actual integral calculation is made by using the recurrence formula obtained based upon the digitizing by Tustin approximate calculation or the like in the same way as described above.

$$\omega\,d\_ref = \frac{1}{s}\alpha\,\omega\,d\_ref \quad (4)$$

And a rotation speed reference model value of a drive shaft ωd_ref may be calculated, taking into account a running resistance as shown in the following equation (5).

$$\omega\,d\_ref = \frac{1}{s}(\alpha\,\omega\,d\_ref - K_r \times \omega\,d\_ref), \quad (5)$$

wherein Kr is set as a value corresponding to a running resistance. Such setting can prevent instability (divergence of integrator) of inner variants due to no pure integrated process.

Figure 6:
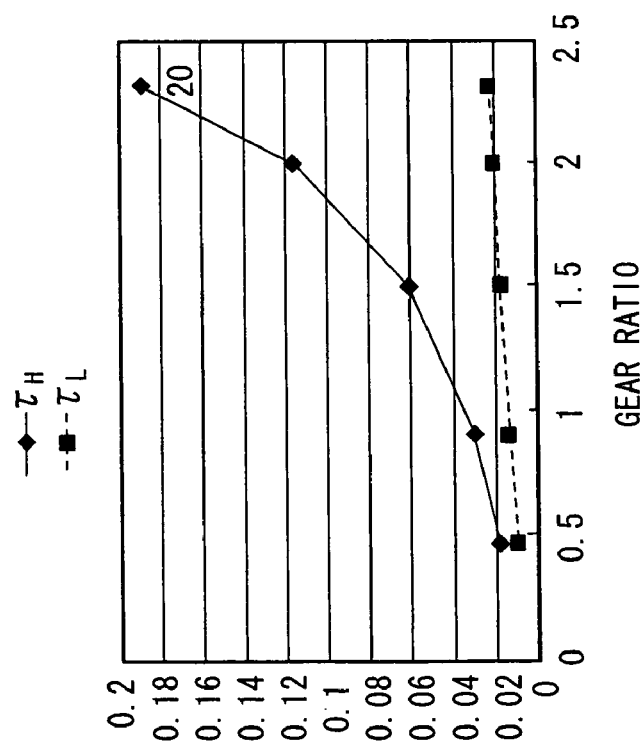
FIG. 6 is a map of a filter constant in response to a gear ratio.

Next, at Step S10 a deviation ωd_err between a rotation speed reference model value of a drive shaft ωd_ref and a rotation speed detection value of a drive shaft ωd (=vehicle speed VSP/R) passes through a band pass filter BPF shown in FIG. 6, and thereby after extracting only a vibration frequency component ωd_err_bpf, a motor torque correction value Tm_FB is set as a result of multiplying the vibration frequency component by a proportional gain Kp.

$$G_{BPF}(s) = \frac{\tau_H S}{(\tau_H S + 1)(\tau_L S + 1)} \quad (6)$$

Actually the motor torque correction value Tm_FB is calculated by using a recurrence formula obtained by Tustin approximate calculation or the like as described above.

Figure 7:
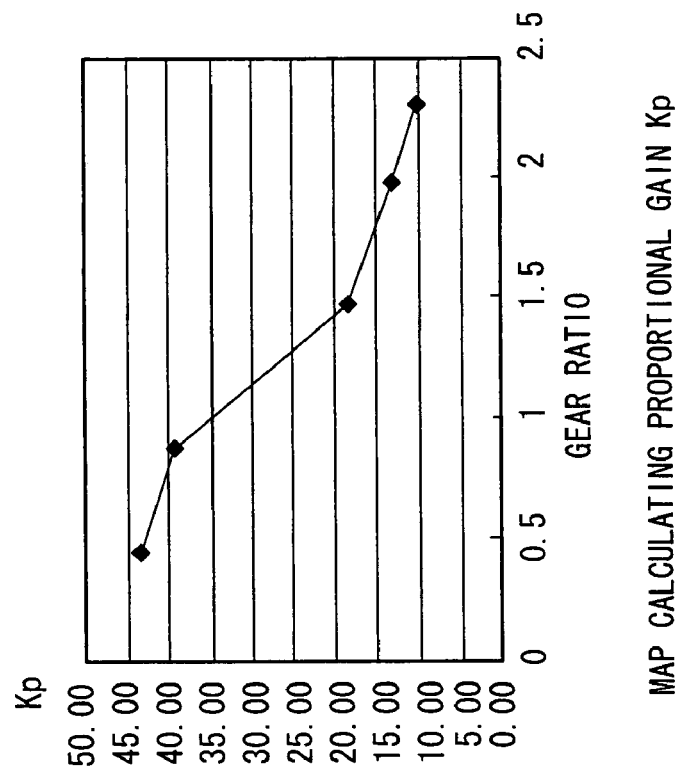
FIG. 7 is a map of a proportional gain in response to a gear ratio.

However, constants τH, τL of the band pass filter BPF and the proportional gain Kp are set based upon a vibration frequency of a control object and actually are calculated by using maps, for instance, as shown in FIGS. 6, 7 corresponding to a gear ratio Ip.

At Step S11 a final motor torque command value Tm*' is set by adding the motor torque correction value Tm_FB to motor torque command value Tm_FF.

At Step S12 the distributed final motor torque command value Tm*' and an engine torque command value Te* are sent to each control controller.

Figure 8:
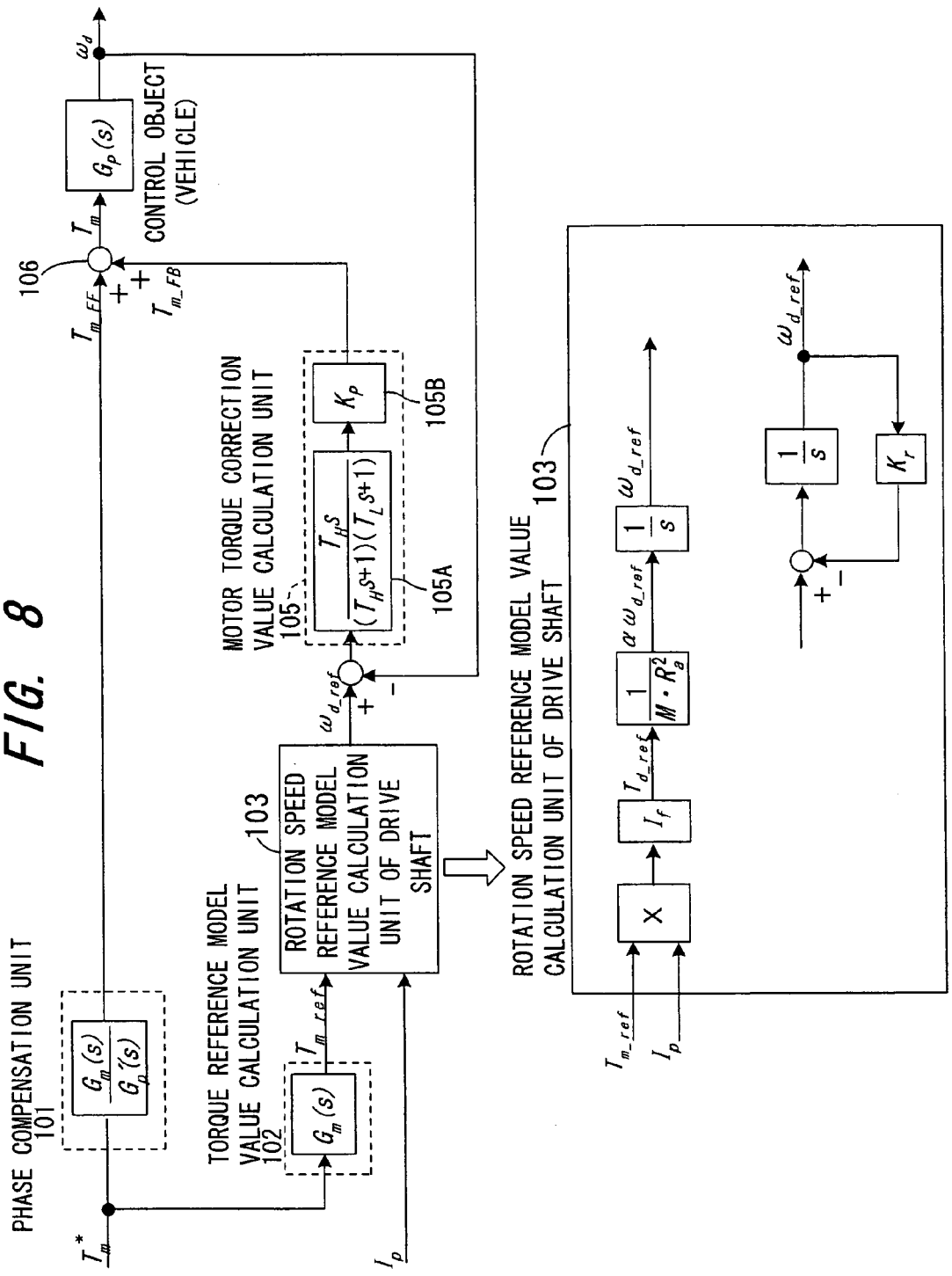
FIG. 8 is a control block diagram showing a part of an integrated controller.

Contents of the above controls are shown in a block diagram of FIG. 8.

In FIG. 8 a phase compensation unit 101 (a compensation device of dynamic characteristic) performs a phase compensation to the motor torque command value Tm* through the filter of the above equation (1) to out put a F/F motor torque command value Tm_FF.

A torque reference model value calculation unit 102 calculates a torque reference model value Tm_ref from an input torque command value Tm* based upon the above equation (2). A rotation speed reference model value calculation unit 103 of a drive shaft calculates a rotation speed reference model value of a drive shaft ωd_ref based upon the above equations (3), (4) as inputs of the torque reference model value Tm_ref and the gear ratio Ip.

At a feedback unit 104 a deviation ωd_err between the rotation speed reference model value of a drive shaft ωd_ref and a detection value of a rotation speed of a drive shaft ωd (=vehicle speed VSP/R) to be actually detected is determined, which then is inputted to a motor torque correction value calculation unit 105. At a band pass filter section 105A in the motor torque correction value calculation unit 105 the deviation ωd_err between the rotation speed reference model value of the drive shaft ωd_ref and the detection value of the rotation speed of the drive shaft ωd (=vehicle speed VSP/R) passes through the band pass filter BPF, and thereby only a predetermined vibration frequency component ωd_err_bpf is extracted, which, at a proportional gain calculation section 105B, is multiplied by a proportional gain Kp to output a motor torque correction value Tm_FB.

At a torque correction unit 106 (calculation device of a target command value), the motor torque command value Tm_FB from the motor torque correction calculation unit 105 is added to the motor torque command value Tm_FF from the phase compensation unit 101 to determine a final motor torque command value Tm*', which then is outputted.

Figure 9:
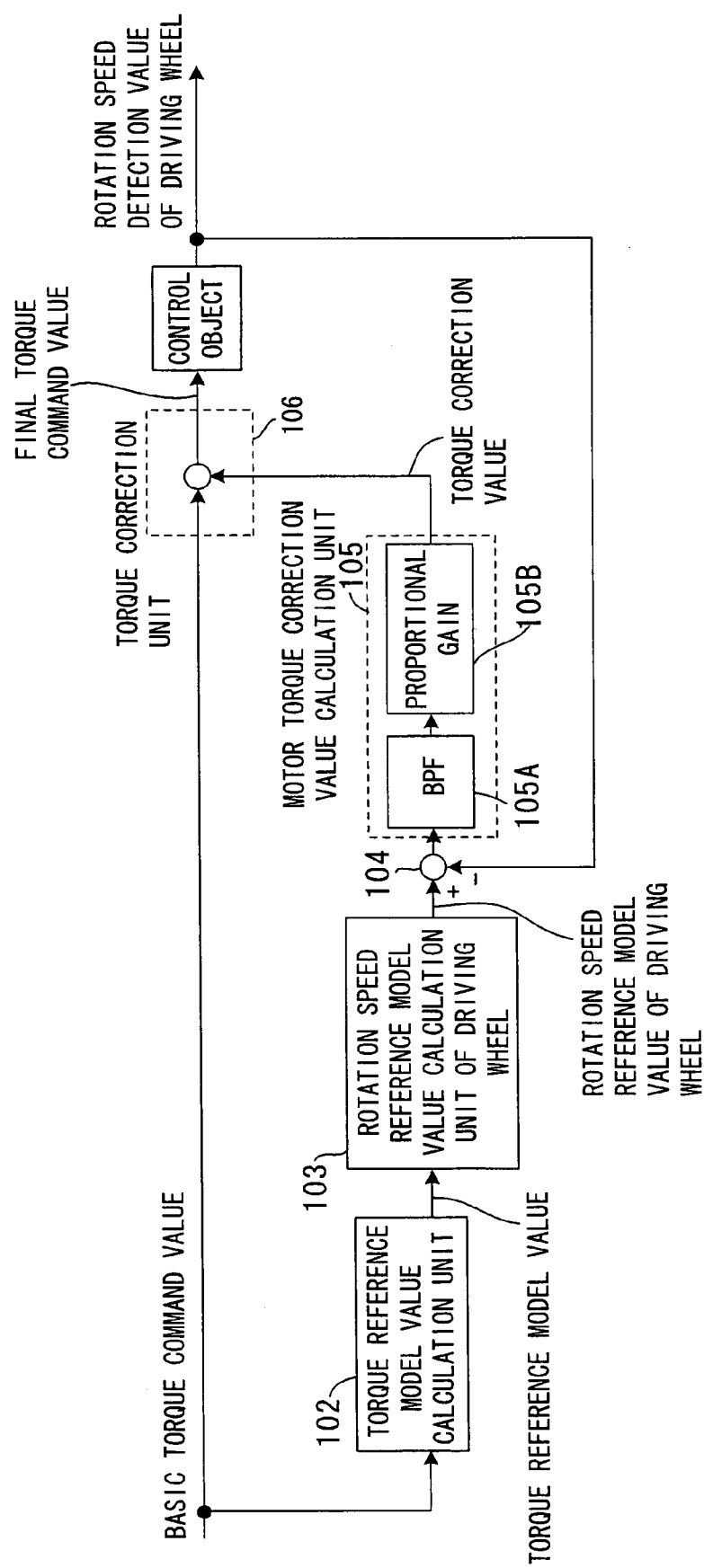
FIG. 9 is a controller block diagram in the same as the above.

However, the phase compensation unit 101 in FIG. 8 can be omitted where a control block diagram is shown in FIG. 9.

As described above, a torque reference model value calculation unit 102 that calculates a torque reference model value Tm_ref based upon transmission characteristics Gm(s) of a response of reference model of the above equation (2) by an input of a torque command value Td* (Te and Tm), a rotation speed reference model value calculation unit 103 of a drive shaft that calculates a rotation reference model value of a drive shaft (or driving wheel) ωd_ref from a torque reference model value Tm_ref, and a motor torque correction value calculation unit 105 that calculates a motor torque correction value Tm_FB from a deviation ωd_err between a rotation speed reference model value of a drive shaft ωd_ref and a rotation speed detection value ωd of a drive shaft are provided. The motor torque correction value calculation unit 105 extracts a vibration frequency component to calculate the motor torque correction value Tm_FB, thereby to correct a torque command value.

Figure 10:
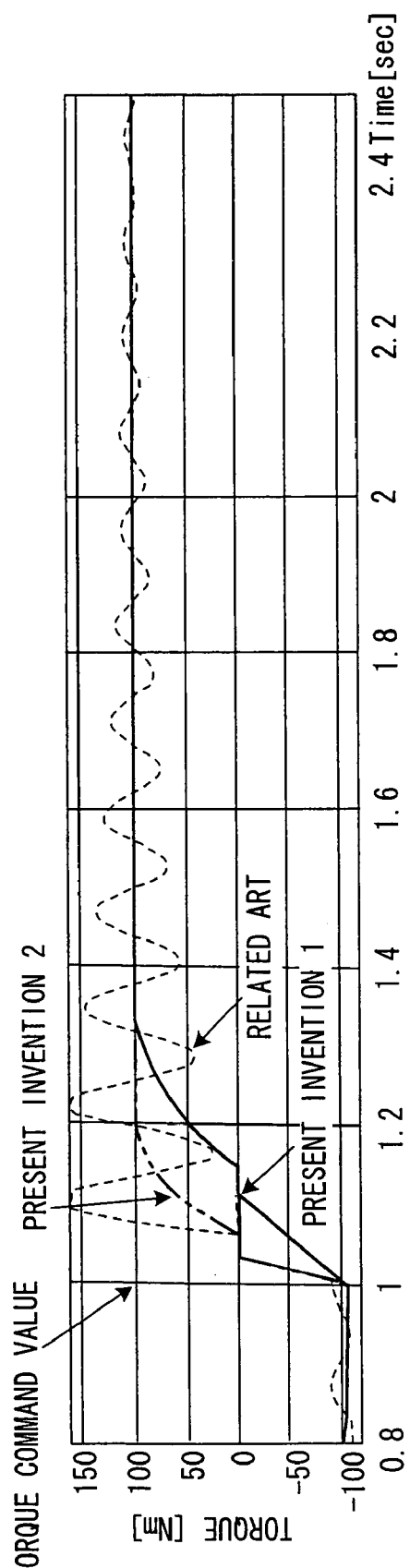
FIG. 10 shows a relation of a torque command value with time, wherein the dotted line shows a case where a vehicle drive system is vibrating, and a solid line and a dashed line show the present invention.

Accordingly since at the motor torque correction value calculation unit 105 a motor torque is corrected to cancel a deviation between the response of the reference model and an actual response, for instance, an influence of a nonlinear element that is not modeled, such as a backlash of a drive system, is difficult to exert and as a result, as shown in FIG. 10, in the case of making a step response by the torque command value Tm*, the final torque command value Tm*', as shown in a solid line of FIG. 10, increases smoothly, being able to restrict vibrations (dotted line in FIG. 10) of a vehicle drive system. However, a solid line in FIG. 10 shows a response in the construction of FIG. 9 which does not have the phase compensation unit 101.

And as shown in FIG. 11, since only a predetermined vibration frequency component is extracted though the band pass filter 105A (FIG. 11(A)) to calculate a correction value, a motor torque can be corrected so as to cancel vibration components of the vehicle drive system without exerting an influence on a normal state (not compensating for road grade, torque deviations, or the like regularly).

Thereby, for instance, even in case a motor torque control is performed together with a control system, such as a vehicle speed control system (or constant speed running control apparatus), that always maintains a vehicle at a constant speed by compensating for a road grade, each control does not interfere with each other, which therefore prevents occurrence of vehicle speed hunting and avoids control interference with other control apparatuses. As a result, design work in mounting the control apparatus on a vehicle can be reduced. However, a band width of FIG. 11(B) is determined in accordance with coefficients T H, T L in FIG. 11(B) and these coefficients T H, T L correspond respectively to constants τH, τL in the above equation (6).

Thus since a compensation for a response of reference model is made at a torque reference model value calculation unit 102 and at a calculation unit 103 (reference model command value calculation unit) for a rotation speed reference model value of a drive shaft, a compensation for a response of a reference model is made, and since at a motor torque correction value calculation unit 105 (correction value calculation device) a compensation for, stability is made, the compensation for a response of reference model and the compensation for stability can be independently controlled with each other. In this case, when only a response of reference model is changed, it is necessary only to make changes of a torque reference model value calculation unit 102 and of a calculation unit 103 for a rotation speed reference model value of a drive shaft without a change of a feedback compensator (motor torque correction value calculation unit 105), and, in the case of changing a compensation for stability, it is necessary only to change the motor torque correction value calculation unit 105 (for instance, a change in characteristics of a band pass filter unit 105A).

Accordingly as compared to a case where a change is made to balance a response of reference model and a stability, a work load necessary for the design can be largely reduced, shortening the development term of a driving force control apparatus.

Further, since a feedforward compensation is in advance made to a motor torque command value Tm* by disposing a phase compensation unit 101 that performs a phase compensation to a torque command value Td* (Te* or Tm*) and calculates the torque command value, thereby to perform a correction to the torque command value, as compared to the construction in FIG. 9 (solid line in FIG. 10) where the phase compensation is not carried out as shown in a dashed line of FIG. 10, the follow-up characteristic to a response of reference model can be improved, which as a result, can achieve a response of reference model, as well as compensate for stability.

Next, a characteristic of a band pass filter 105A as shown in FIG. 11(A) can alter a frequency band width and a proportional gain in accordance with vibration frequencies of a control object (a vehicle).

For instance, as shown in FIG. 11(B), as compared to a case where a vibration frequency is in the standard range, (1) In the case of a low vibration frequency (ωp1 in FIG. 11 (B)), the band width is made narrow and the proportional gain Kp is increased.

(2) In the case of a high vibration frequency (ωp 3 in FIG. 11(B)), the band width is made wide and the proportional gain Kp is decreased. However, ωp 1, ωp 2, and ωp 3 in FIG. 11(B) show control each central value of the frequency band width to be set.

In the case of the low vibration frequency, fluctuations of the frequency are relatively small. Accordingly even by setting the band width of the band pass filter section 105A as relatively narrow, the vibration frequency component can be extracted without fail, and also by narrowing the band width, the proportional gain can be increased without damage of stability in the feedback control.

On the other hand, in the case of a high vibration frequency the fluctuations of the frequency are relatively large. Accordingly by setting the band width of the band pass filter BPF as relatively wide, the vibration frequency can be certainly extracted, as a result restricting the vibration. By thus setting a band width and a proportional gain Kp of a band pass filter section 105A depending on a vibration frequency, a motor torque correction value Tm_FB suitable for the vibration frequency can be calculated, thereby to improve a vibration restriction performance.

And the phase compensation unit 101, as shown in the above equation (1), is constructed of a reverse system of a transmission characteristic Gp (s) to a drive shaft torque and a response of reference model Gm (s) of a driving force that a designer desires for an acceleration operation, which can cause an improvement of a follow-up performance to a response of reference model, improving the response of the reference model, as well as compensating for stability.

And as shown in FIG. 8, by making a transmission function Gm (s) of a reference model of a phase compensation unit 101 to compensate for a phase by feedforward to be in accordance with a transmission function Gm (s) of a response of reference model of a torque reference model value calculation unit 102, a compensation amount to be performed in a feedback compensation unit can be reduced, thereby to further improve the follow-up characteristic to a response of reference model.

And when a vibration frequency is fluctuated caused by a change of a gear ratio of the non-stage transmission 5 or the like, a resonance frequency of the band pass filter section 105A may correspond to the vibration frequency based upon the fluctuation factor (gear ratio) or a frequency band width may change so that the vibration frequency enters into the band width, where even if the vibration frequency fluctuates, the vibration can be always restricted.

Figure 12:
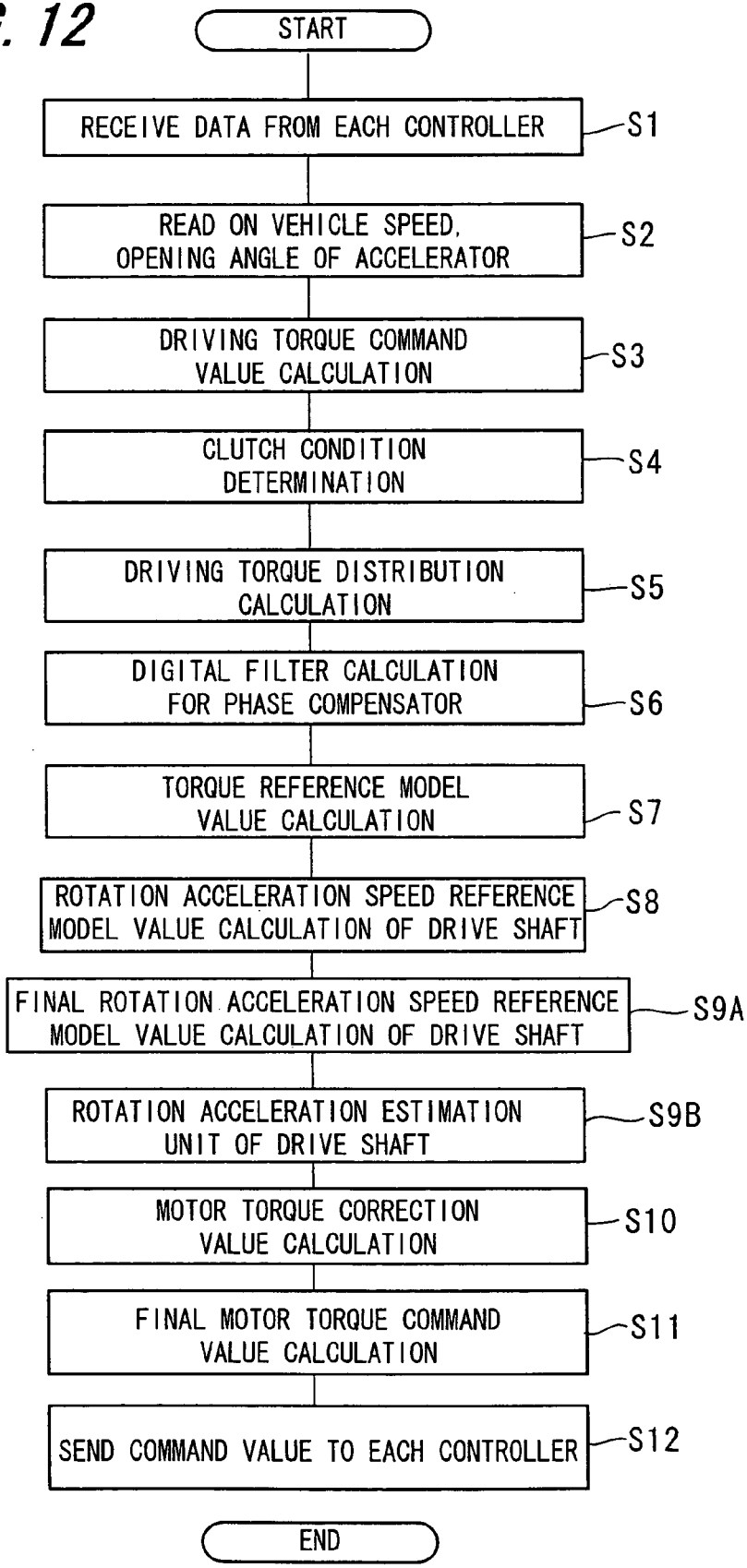
FIG. 12 shows a second embodiment of the present invention and a flow chart showing one example of controls performed in an integrated controller.
Figure 13:
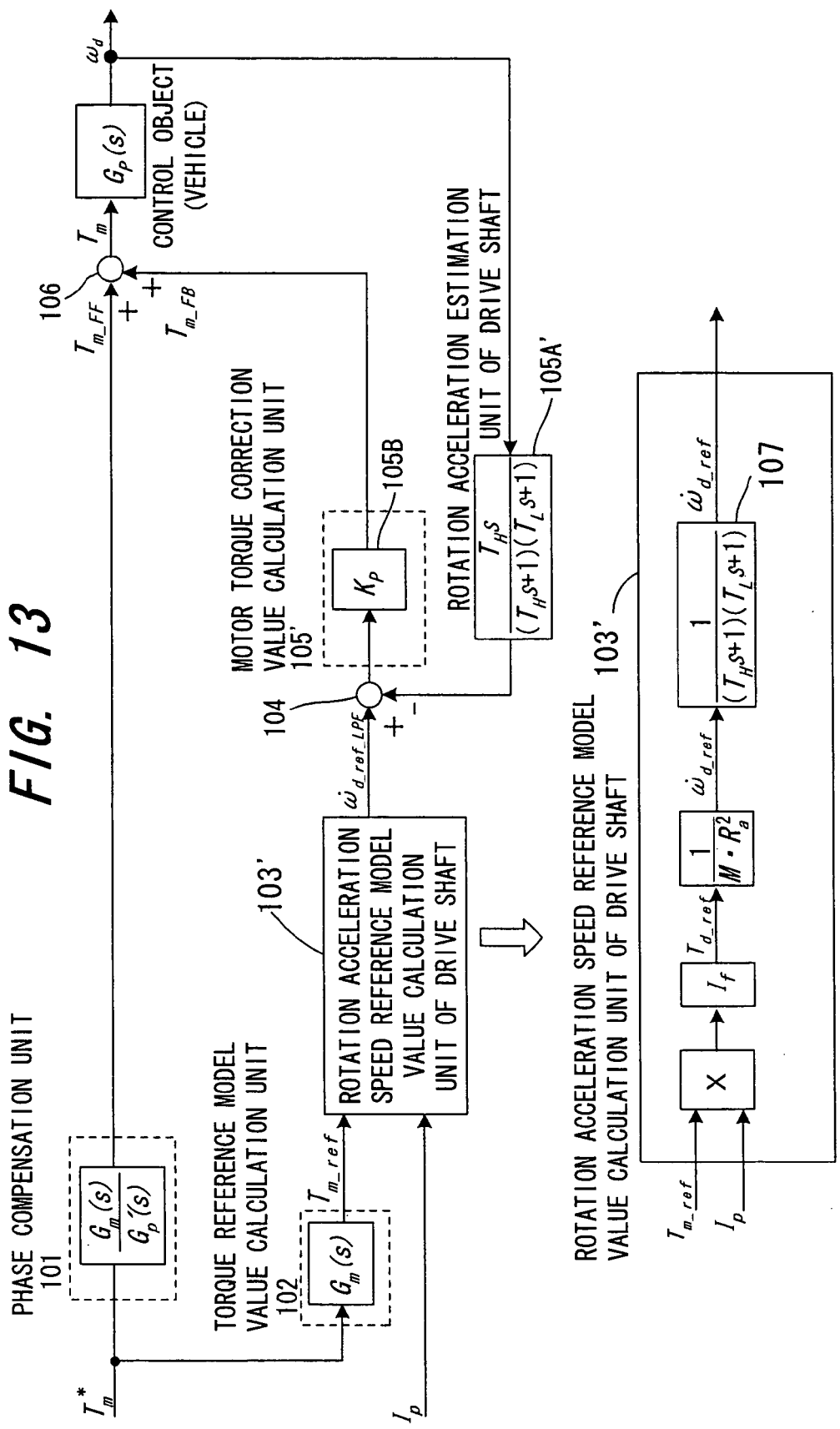
FIG. 13 is a control block diagram showing a part of the integrated controller.
Figure 14:
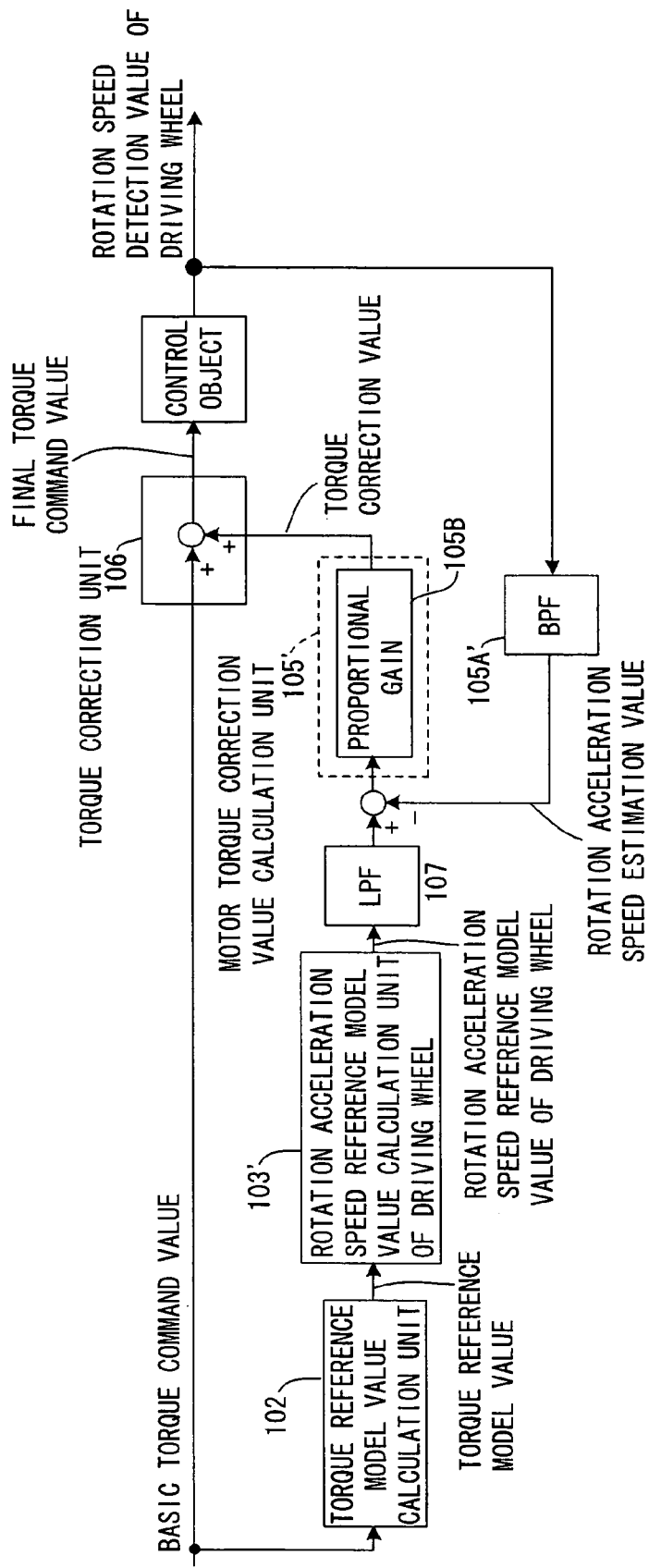
FIG. 14 is a control block diagram in the same as the above.

FIGS. 12-14 show a second embodiment.

This embodiment differs from the first embodiment in that a rotation speed reference model value of a drive shaft (driving wheel) is not calculated from a torque reference model value, but a rotation acceleration speed reference model value of a drive shaft (driving wheel) from a torque reference model value is calculated and an actual rotation acceleration speed of the drive shaft is estimated and then a torque correction value is calculated from a deviation between them.

FIG. 12 shows one example of a control to be performed in the integrated controller 10 and replaces Step S9 of a flow chart in FIG. 2 of the first embodiment for Step S9A and Step S9B. A control block diagram in FIG. 13 partially changes the motor torque correction value calculation unit 105 of the control block diagram of the first embodiment in FIG. 8, as well as changes the feedback unit.

Firstly in a flow chart of FIG. 12 an explanation of Steps S1-S8 and S10-S12 is omitted because of being identical to those in the first embodiment.

At Step S9A a low pass filter process is carried out to a reference model value of a drive shaft rotation acceleration speed α ω d_ref based upon the following equation (7) and a final reference model value of a drive shaft rotation acceleration speed α ω d_ref_l p f is calculated.

$$G_{LPF}(s) = \frac{1}{(\tau_H s + 1)(\tau_L s + 1)} \quad (7)$$

In addition, constants τH, τL of the low pass filter are calculated by using a map as shown in FIG. 6 in the same as the first embodiment.

Next, at Step S10 an estimation value α ω d_est of a rotation acceleration speed of a drive shaft is calculated based upon the following equation through the band pass filter by an input of the rotation acceleration speed α ω d of the drive shaft. However, the rotation acceleration speed α ω d of the drive shaft is calculated by differentiating an actual rotation speed of the drive shaft.

$$G_{BPF}(s) = \frac{\tau_H s}{(\tau_H s + 1)(\tau_L s + 1)} \quad (8)$$

And a motor torque correction value Tm_FB is calculated by multiplying a deviation between a final reference model value of the drive shaft rotation acceleration speed α ω d_ref_l p f and the estimation value α ω d_est of the drive shaft rotation acceleration speed by a proportional gain Kp. The proportional gain Kp is calculated using a map as shown in FIG. 7 in the same way as the first embodiment.

Such constitution causes no pure integral processing and thereby the motor torque correction value Tm_FB can be calculated without possible instability of inner variants (divergence of an integrator).

And a motor torque correction will be explained with reference to control blocks in FIGS. 13 and 14.

A torque reference model value calculation unit 102 calculates a torque reference model value Tm_ref by a transmission characteristic Gm (s) of a response of reference model (non-vibration model) based upon an input of a torque command value Tm*, and a driving wheel rotation acceleration speed reference model value calculation unit 103' calculates a drive shaft (or driving wheel) rotation acceleration speed reference model value α ω d_ref from a torque reference model value Tm_ref.

Further, a driving wheel acceleration speed value estimation value calculation section 105A estimates a driving wheel rotation acceleration speed α ω d by extracting a predetermined vibration frequency component using a band pass filter as an input of a differential value of a driving wheel rotation speed ωd. The driving wheel rotation acceleration speed reference model value calculation unit 103' calculates a final drive shaft rotation acceleration speed reference model value that performs a low pass filter processing to the drive shaft rotation acceleration speed reference model value α ω d_ref by using a low pass filter (LPF) 107 taking into account only a delay element component of the band pass filter. At the motor torque correction value calculation unit 105', the motor torque correction value Tm_FB is calculated based upon a deviation between the final reference model value of the drive shaft rotation acceleration speed α ω d_ref_l p f with the low pass filtering and the drive shaft rotation acceleration speed estimation value α ω d_est.

And at a torque correction unit 106 the torque correction value Tm* is corrected based upon the motor torque correction value Tm_FB to calculate a control target command value.

Thereby the motor torque is corrected so that a deviation between a response of reference model and an actual response is cancelled at the motor torque correction value calculation unit 105' and at the driving wheel acceleration speed estimation value calculation unit 105A' and therefore, for instance, an influence of a nonlinear element that is not modeled, such as a backlash of a drive system, is difficult to exert and as a result, as shown in FIG. 10 of the first embodiment, in the case of making a step response by the torque command value Tm*, the final torque command value Tm*', as shown in a solid line of FIG. 10, increases smoothly, being able to restrict vibrations (dotted line in FIG. 10) of a vehicle drive system.

And since only a predetermined vibration frequency component is extracted though the band pass filter to calculate a correction value at the drive shaft rotation acceleration speed estimation value calculation unit 105A', only the vibrations can be restricted without exerting an influence on a normal state (not compensating for road grade, torque deviations, or the like regularly).

Thereby, for instance, even in case a motor torque control is performed together with a control system, such as a vehicle speed control system (or constant speed running control apparatus), that always maintains a vehicle at a constant speed by compensating for a road grade, each control does not interfere with each other, which therefore prevents occurrence of vehicle speed hunting and avoids control interference with other control apparatuses. As a result, design work in mounting the control apparatus on a vehicle can be reduced.

And the band pass filter is constructed of the above equation (8) and the low pass filter is constructed of the above equation (7), and the motor torque correction value Tm_FB is calculated using at least a proportional element from the deviation between the final reference model value of the drive shaft rotation acceleration speed α ω d_ref_l p f and the drive shaft rotation acceleration speed estimation value α ω d_est, thereby to restrict the vibrations, as well as achieve the response of the reference model, and further since a compensation for a response of reference model is independent of a compensation for stability, it becomes possible to change the response of the reference model without a change of the feedback compensation unit (motor torque correction value calculation unit 105').

In the above first and the second embodiment, it is explained that the motor torque command value Tm* is set as a basic command value when the driving torque command value Td* is distributed to the engine torque command value Te* and the motor torque command value Tm*, but the similar control may be performed with respect to the engine torque command value Te', namely the engine torque command value Te' is set as a basic command value and the compensation for the response of the reference model is independent of the compensation for the stability whereby in case one of both the compensations is changed, the other is not influenced thereby. Accordingly the compensation for the response of the reference model is compatible with the compensation for the stability, which enables restriction of the vibrations, as well as a change in the designing easily. However, in this case, a control object is a throttle actuator 20 that controls an output of an engine in place of the alternating current synchronous motor 1.

Further, other embodiments will be explained with reference to FIG. 15-24.

Figure 15:
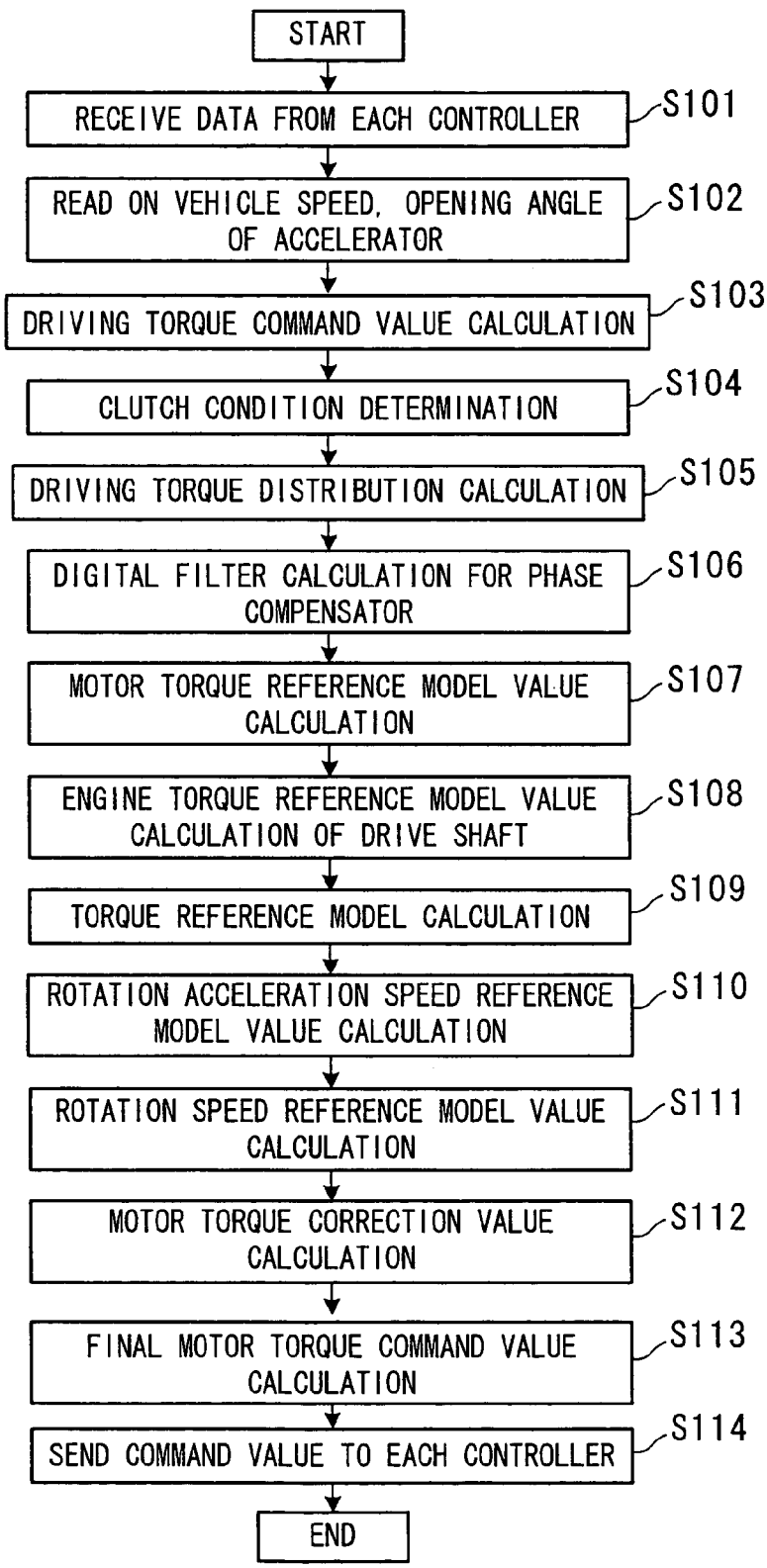
FIG. 15 shows a third embodiment and is a flow chart showing one example of controls performed in an integrated controller.

FIG. 15 shows contents of control to be performed in the above-described integrated controller 10 most of which are substantially identical to Step S1-Step S12, but will be explained again in more detail. Namely Step 1-Step S6 in FIG. 2 are substantially the same as Step S101-Step S106.

At Step S101 vehicle condition signals outputted from the above-described controllers 11-15, such as a battery charge amount SOC, a gear ratio Ip of the non-stage transmission and the like are received. At Step S102 an acceleration operation amount APO, a vehicle speed signal VSP, and the like are measured based upon signals from each sensor.

At Step S103 a driving torque command value Td* is calculated based upon the acceleration amount APO and the vehicle speed VSP. This driving torque command value Td* is calculated based upon a relationship with a vehicle speed VSP including an acceleration operation amount APO (an opening angle of the accelerator in FIG. 3) as a parameter with reference to, for instance, a map as shown in FIG. 3.

At Step S104 a clutch control signal CLsig for determining a condition of the electromagnetic clutch 3 is calculated based upon a vehicle condition signal such as a battery charge amount SOC and a vehicle speed VSP. In case the vehicle speed VSP exceeds a predetermined value, or the battery charge amount SOC is lowered, the clutch control signal CLsig sets a control signal adapted to engage the electromagnetic clutch 3 to drive a vehicle by the engine 2, as well as drives a power generation motor to charge the battery. On the other hand, in case the vehicle speed VSP is less than a predetermined value and the battery charge amount SOC is sufficient, the clutch control signal CLsig adapted to disengage the electromagnetic clutch 3 is set to drive a vehicle by the alternating current synchronous motor 1.

At Step S105 a drive torque command value Td* is distributed to an engine basic torque command value Te* and a motor basic torque command value Tm*. The driving torque command value Td* may be distributed based upon, for instance, a vehicle speed VSP or a battery charge amount SOC.

At Step S106 a phase compensation is made to the engine basic torque command value Te* and the motor basic torque command value Tm* based upon a phase compensation filter We(s) shown in the following equation (101), to calculate an engine torque command value Te_FF and a motor torque command value Tm_FF.

$$W_e(s) = W_m(s) = \frac{Gm(s)}{Gp(s)} = \frac{s^2 + 2\xi_p\omega_p s + \omega_p^2}{s^2 + 2\xi_m\omega_m s + \omega_m^2} \cdot \frac{\omega_m^2}{\omega_p^2} \quad (101)$$

$$Gm(s) = \frac{\omega_m^2}{s^2 + 2\xi_m\omega_m s + \omega_m^2},$$

-continued $$G'_p(s) = \frac{\omega_p^2}{s^2 + 2\xi_p\omega_p s + \omega_p^2},$$

wherein
G'p (s): Transmission Function of Drive Shaft Torque in response to an Operation Amount of an Accelerator,
Gm (s): Response of Reference Model of Driving Torque,
ω p: Natural Frequency of Vehicle,
ω m: Natural frequency of Target Vehicle,
ξ p: Damping Coefficient of Vehicle,
ξ m: Damping Coefficient of Target Vehicle, and
s: Laplace Operator.

And Gm(s) is a non-vibration model (ξm=1.0) and ωm=ωp not to generate a response delay. This calculation can be carried out in the same way with Japanese Unexamined Patent Publication No. 10-227231A. An actual calculation is made by using a recurrence formula obtained based upon the digitizing by Tustin approximate calculation or the like.

Figure 16:
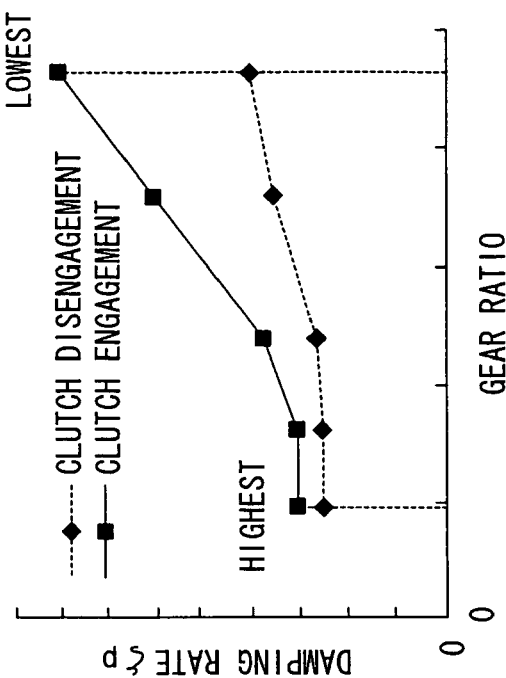
FIG. 16 is a map of a natural frequency in response to a gear ratio.
Figure 17:
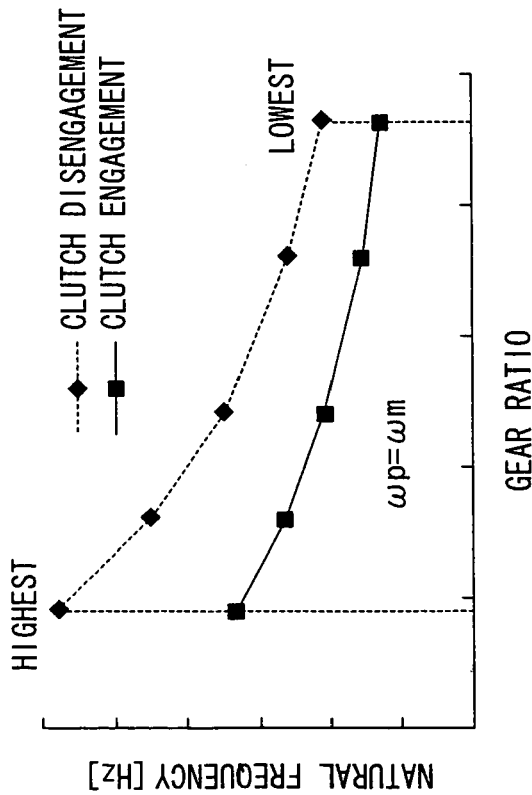
FIG. 17 is a map of a damping rate in response to a gear ratio.

Each constant of the phase compensation filter is determined based upon a gear ratio Ip of a non-stage transmission and a clutch control signal CLsig of an electromagnetic clutch 3 by using a map shown in FIG. 16 or FIG. 17.

FIG. 16 shows a map of a natural frequency ω of a vehicle in response to a gear ratio Ip and FIG. 17 shows a map of a damping coefficient ξ of a vehicle in response to a gear ratio Ip.

Next, at Steps S107-S109 a motor torque correction value calculation processing will be explained.

At Step S107, a motor torque reference model value Tm_ref is calculated based upon the following equation (102) from an input of a motor basic torque command value Tm*. An actual calculation is made by using a recurrence formula obtained based upon the digitizing by Tustin approximate calculation or the like.

$$Tm\_ref = G_m(s) \cdot Tm^* \quad (102)$$

At Step S108, an engine torque reference model value Te_ref is calculated based upon the following equation (103) from an input of an engine basic torque command value Te*.

$$Te\_ref = G_m(s) \cdot G_e(s) \cdot Te^*, \quad (103)$$

wherein Ge (s) is an engine delay model and is represented by the following equation (104).

[Equation 13] (104)

$$G_e(s) = \frac{1}{\tau_e s + 1} \cdot e^{-L_e},$$

wherein τ e: Time Constant, and
L e: Waste Time.

Figure 19:
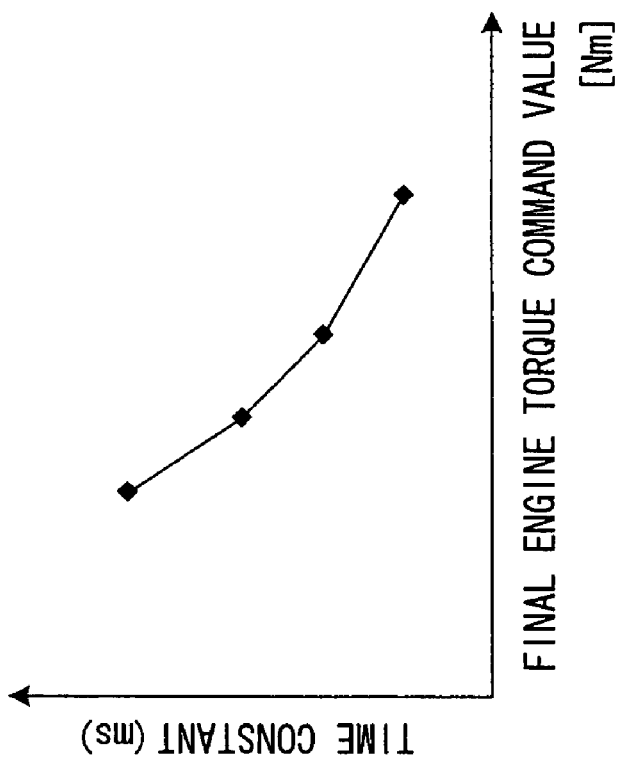
FIG. 19 is a map of a time constant in response to a final engine torque command value.
Figure 18:
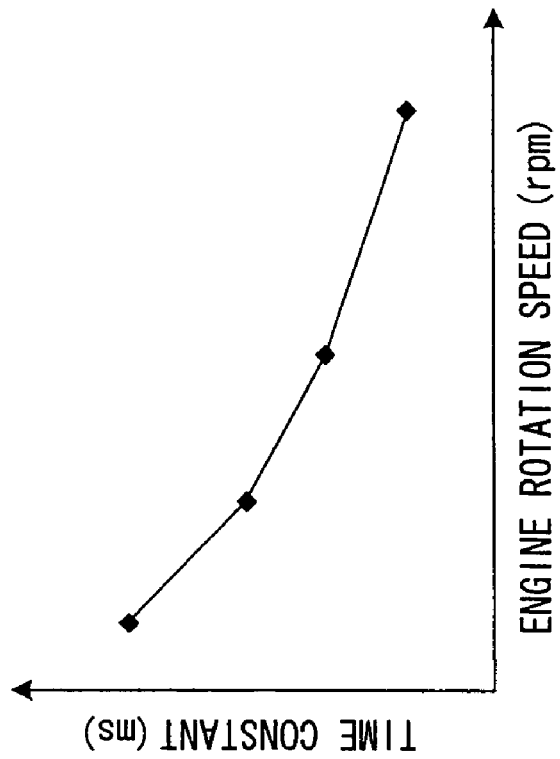
FIG. 18 is a map of a time constant in response to a gear rate.

As an engine rotation speed or an engine torque command value actually increases, an engine time constant τ e becomes smaller. Therefore, a time constant τ e of an engine delay model is modified corresponding to an engine rotation speed or an engine torque command value (final engine torque command value in FIG. 19) as shown in FIG. 18 or FIG. 19. FIG. 18 is a map showing a relation of time constant τ e in response to an engine rotation speed value. FIG. 19 shows a map of time constant τ e in response to an engine torque command value. Herein either one of the maps in FIG. 18 and FIG. 19 is used.

When the time constant τ e of the engine delay model is set as smaller than an actual engine delay time, a torque correction value calculation unit (feedback to be described later) functions so that delay of the engine 2 corresponds to the time constant and the waste time set in the model, thereby enabling the delay of the engine 2 to be smaller. Accordingly the vibrations can be restricted and a response to a driving torque can be improved (faster).

Next, at Step S109, a torque reference model value Tme_ref to be transmitted to the non-stage transmission 5 according to the following equations (105 and (106) based upon the clutch control signal CLsig (engagement condition of the electromagnetic clutch 3) from the engine torque reference model value Te_ref and the motor torque reference model value Tm_ref.

(1) In case the electromagnetic clutch 3 is engaged (parallel hybrid).

$$Tme\_ref = Te\_ref + Tm\_ref \quad (105)$$

(2) In case the electromagnetic clutch 3 is disengaged (series hybrid).

$$Tme\_ref = Tm\_ref \quad (106)$$

At Step S110, a driving wheel rotation acceleration speed reference model value α ω d_ref is calculated according to the following equation (107) from the torque reference model value T m e_ref and the gear ratio i p.

$$\alpha \omega d\_ref = \frac{Ip \times If}{M \times Ra^2} Tme\_ref, \quad (107)$$

wherein
M: Vehicle Mass,
R: Tire Radius, and
i f: Final Reduction Ratio.

Figure 31:
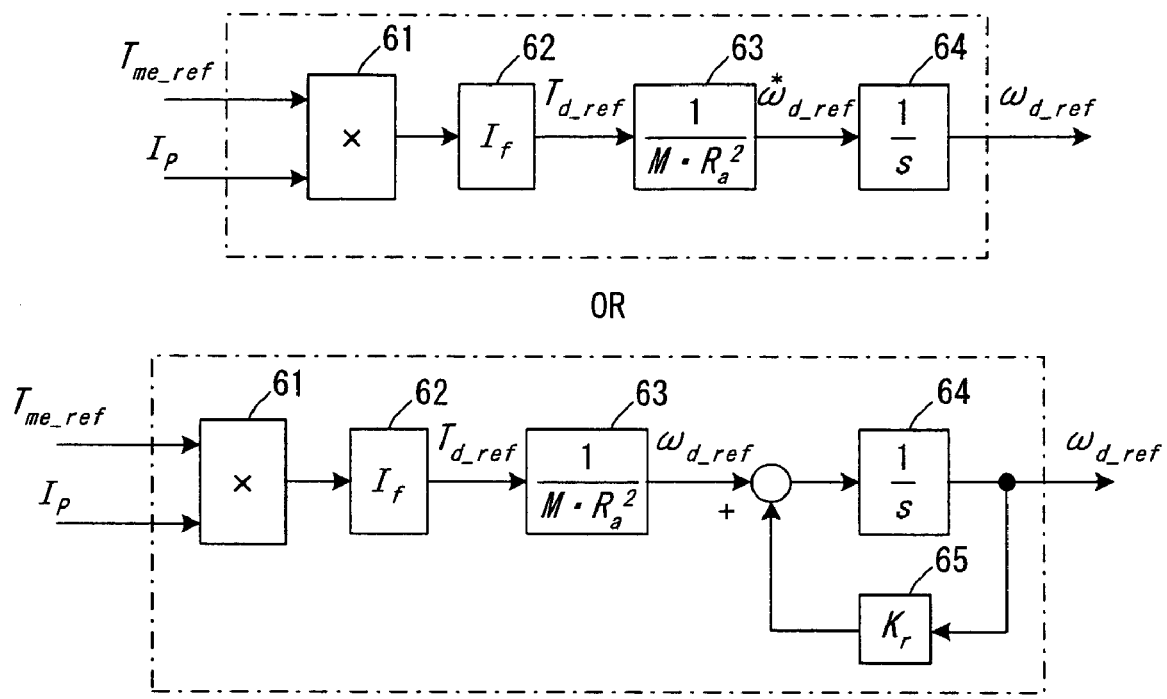
FIG. 31 is a control block diagram of a rotation speed reference model value calculation unit of a driving wheel.

This calculation is made at a driving wheel rotation speed reference model value calculation unit 106 described later and the detail thereof corresponds to blocks 61, 62, and 63 in FIG. 31.

At Step S111 a driving wheel rotation speed reference model value ωd_ref (reference model corresponding to vehicle speed) is calculated by integrating a driving wheel rotation acceleration speed reference model value α ω d_ref as shown in the following equation (108). An actual integral calculation is made by using the recurrence formula obtained based upon the digitizing by Tustin approximate calculation or the like in the same way as described above.

$$\omega d\_ref = \frac{1}{s} \alpha \omega d\_ref \quad (108)$$

And a driving wheel rotation speed reference model value ωd_ref may be calculated, taking into account a running resistance as shown in the following equation (109). This calculation corresponds to blocks 64 and 65 in FIG. 31.

$$\omega d\_ref = \frac{1}{s}(\alpha \omega d\_ref - K_r \cdot \omega d\_ref), \quad (109)$$

wherein

Kr is set as a value corresponding to a running resistance. Such setting can prevent instability (divergence of integrator) of inner variants due to no pure integral processing.

Next, at Step S112 a deviation ωd_err between a driving wheel rotation speed reference model value ωd_ref and a driving wheel rotation speed detection value ωd (=vehicle speed VSP/Rα, a detection value corresponding to a vehicle speed) passes through a band pass filter BPF shown in the following equation (110), and thereby after extracting a vibration frequency component ωd_err_b p f, a correction value Tm_FB of a motor torque command value is set as a result of multiplying the vibration frequency component ωd_err_b p f by a proportional gain Kp.

$$G_{BPF}(s) = \frac{\tau_H S}{(\tau_H S + 1)(\tau_L S + 1)}. \quad (110)$$

$$Tm_{\_FB} = Kp \cdot G_{BPF}(s) \cdot (\alpha \omega \text{d\_ref} - \omega d). \quad (111)$$

Actually the motor torque correction value Tm_FB is calculated by using a recurrence formula obtained by Tustin approximate calculation or the like as described above. However, constants τH, τL of the band pass filter BPF and the proportional gain K p are set based upon a vibration frequency of a control object and actually are calculated by using a map, for instance, as shown in FIG. 20, FIG. 21, and FIG. 22, corresponding to a gear ratio I p and a clutch control signal CL sig.

Figure 20:
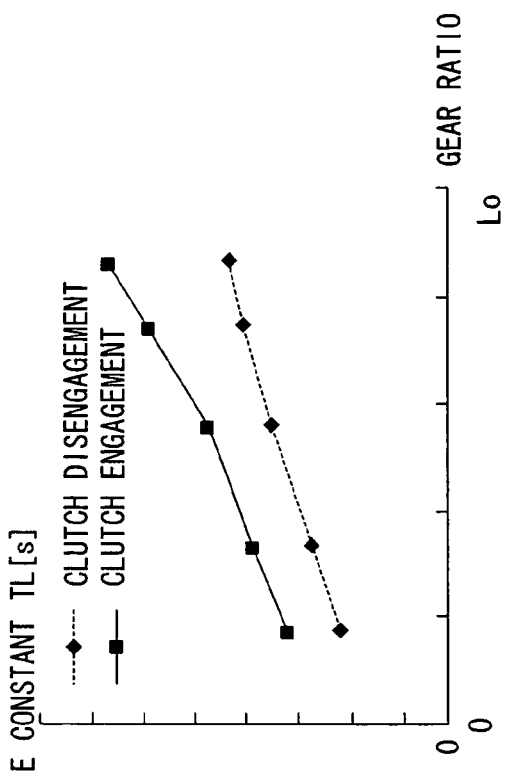
FIG. 20 is a map of a time constant $\tau H$ in response to a gear ratio and an engagement condition of an electromagnetic clutch.

Herein FIG. 20 shows a map of time constant τH corresponding to a gear ratio i p where at a disengagement condition of the electromagnetic clutch 3, a map shown in a dotted line is used and at an engagement condition of the electromagnetic clutch 3, a map shown in a solid line is used. In this map the time constant τ H is set to be larger as the gear ratio i p goes to lower gear ratio "Lo" and at the engagement is set as larger than at the disengagement. In FIG. 20-FIG. 22, the time constant "zero" side is in the range of a higher gear ratio and the larger time constant side is in the lower gear ratio.

Figure 21:
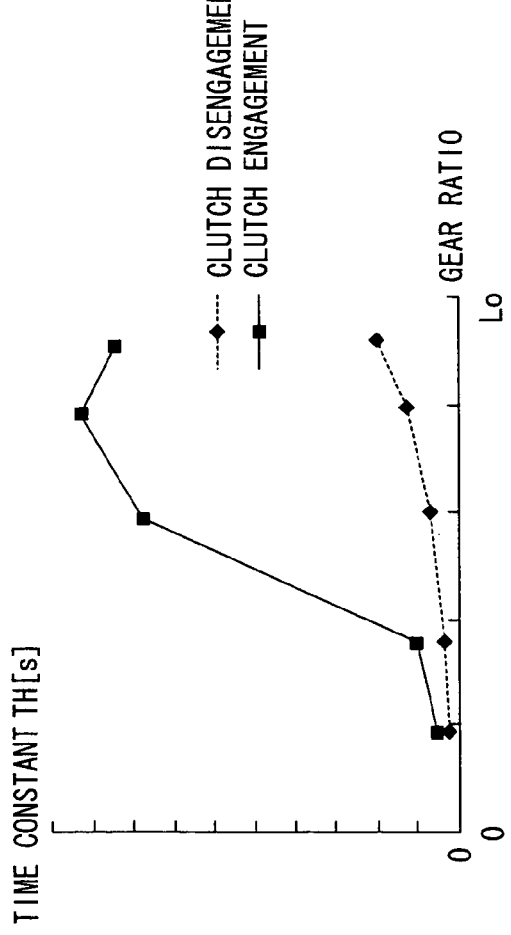
FIG. 21 is a map of a time constant $\tau L$ in response to a gear ratio and an engagement condition of an electromagnetic clutch.

Herein FIG. 21 shows a map of time constant τ L corresponding to a gear ratio i p where at a disengagement condition of the electromagnetic clutch 3, a map shown in a dotted line is used and at an engagement condition of the electromagnetic clutch 3, a map shown in a solid line is used. In this map the time constant τ L is set to be larger as the gear ratio i p goes to lower gear ratio (larger) and at the engagement is set as larger than at the disengagement.

Figure 22:
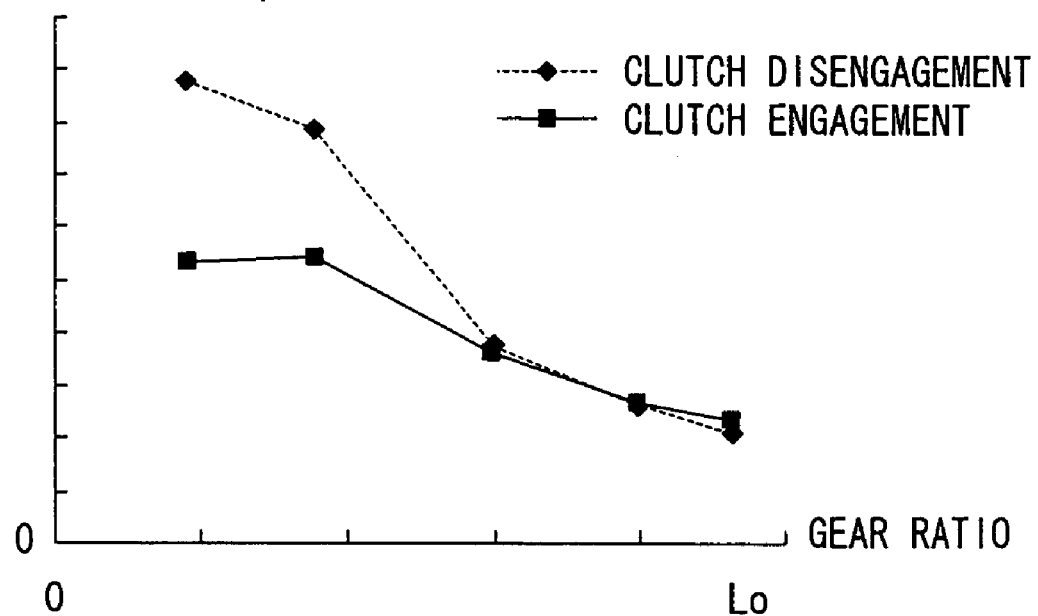
FIG. 22 is a map of a proportional gain Kp in response to a gear ratio and an engagement condition of an electromagnetic clutch.

Herein FIG. 22 shows a map of a proportional gain Kp corresponding to a gear ratio i p where at a disengagement condition of the electromagnetic clutch 3, a map shown in a dotted line is used and at an engagement condition of the electromagnetic clutch 3, a map shown in a solid line is used. In this map the proportional gain K p is set as smaller as the gear ratio i p goes to lower gear ratio "Lo" and in a higher gear ratio side at the disengagement of the electromagnetic clutch 3 the proportional gain K p is set as larger than at the engagement.

Next, at Step S113, a correction value Tm_FB of the motor torque command value is added to the motor torque command value Tm_FF determined at Step S6, which is set as a final motor torque command value Tm*'.

$$Tm*'=Tm\_FF+Tm\_FB.$$

And at Step S114, the distributed final motor torque command value Tm*' and engine torque command value Te*' (=Te_FF) are sent to each control controller.

Figure 23:
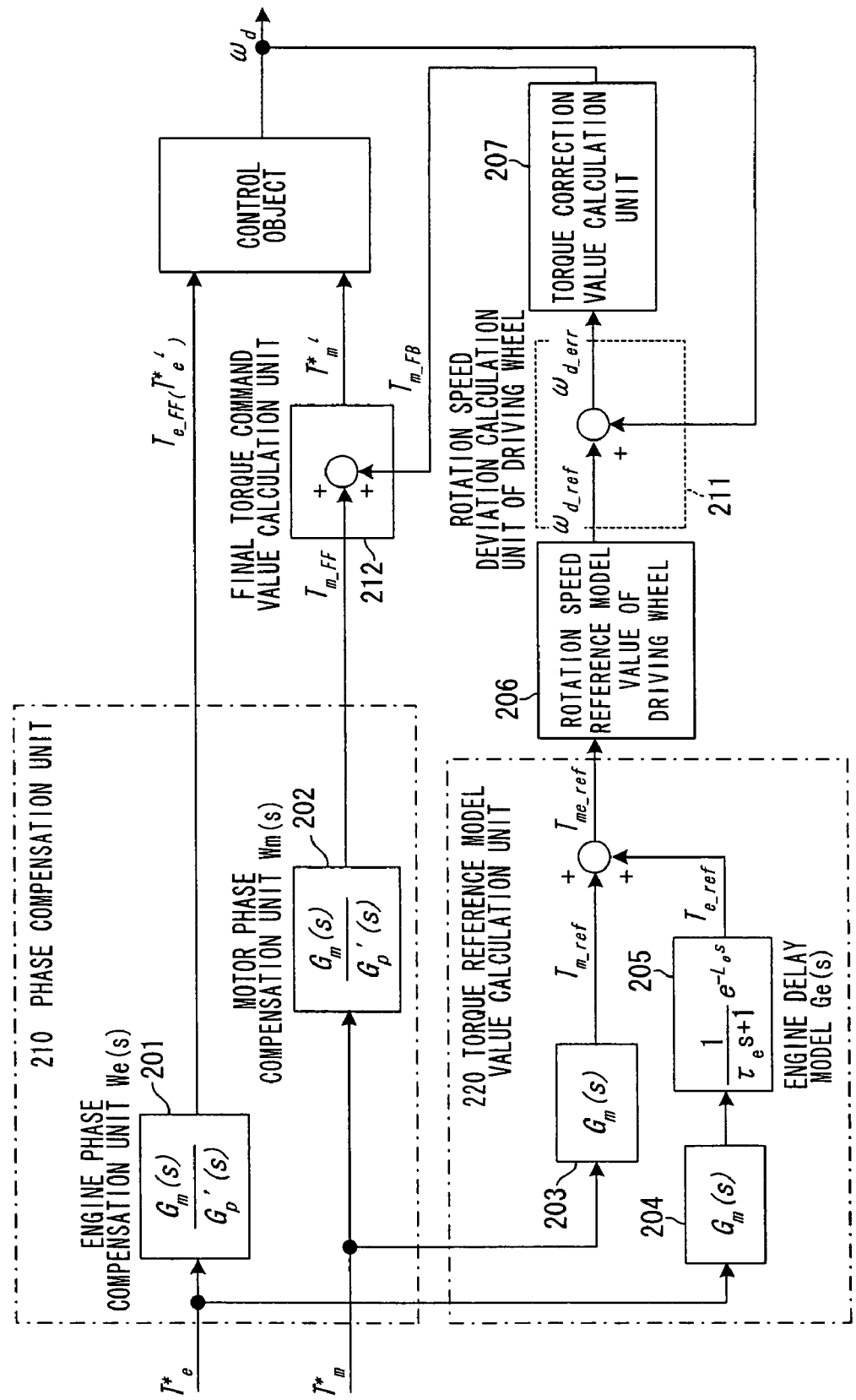
FIG. 23 is a control block diagram showing a part of the integrated controller.

The control contents are shown in a block diagram of FIG. 23.

In FIG. 23 a phase compensation unit 210 (dynamic characteristic compensation device) is provided with an engine phase compensation unit 201 and a motor phase compensation unit 202 that perform a phase compensation respectively to an engine basic torque command value Te* and a motor basic torque command value Tm* by a filter We (s) and a filter Wm (s) of the above equation (101) where the engine phase compensation unit 201 outputs an engine torque command value Te_FF and the motor torque compensation unit 202 outputs the motor torque command value Tm_FF.

The torque reference model value calculation unit 220 calculates an engine torque reference model value Te_ref from a non-vibration model 204 and an engine delay model 205 based upon inputs of a non-vibration model 203 that calculates a torque reference model value Tm_ref by the above equation (102) from the motor basic torque value Tm* and the engine basic torque value Te* and further calculates a torque reference model value Te_ref from the engine torque reference model value Te_ref and the motor torque reference model value Tm_ref.

Herein a response of reference model Gm (s) of a driving torque is set as being in common with the engine phase compensation unit 201, the motor phase compensation unit 202, and the non-vibration models 203, 204, which causes an decrease of an amount to be corrected by feedback compensation, thereby to improve the follow-up characteristic to a response of reference model.

The driving wheel rotation speed reference model value calculation unit 206 calculates the driving wheel rotation speed ωd_ref according to the above equation (107) from an input of the torque reference model value Tme_ref. The driving wheel rotation speed reference model deviation calculation unit 211 determines a deviation ωd_err between the driving wheel rotation speed ωd_ref and the driving wheel rotation speed detection value ωd (=vehicle speed VSP/Rα), and the torque correction value calculation unit 207 extracts only the vibration frequency component ωd_err_bpf through the band pass filter BPf of the above equation (110) and outputs the motor torque correction value Tm_FB by multiplying the vibration frequency component ωd_err_bpf by the proportional gain Kp based upon the above equation (111).

And a final torque command value calculation unit 212 (a target command value calculation device) adds the motor torque correction value Tm_FB from the torque correction value calculation unit 207 to the motor torque command value Tm_FF from the phase compensation unit 210, to determine and output the final motor torque command value Tm*'.

As described above, the motor torque reference model calculation unit (203) that calculates the motor torque reference model value Tm_ref based upon the transmission characteristic Gm (s) of the response of the reference model of the driving torque from an input of the motor basic torque command value Tm*, the engine torque reference model value calculation unit (204, 205) that calculates the engine torque reference model value Te_ref based upon from the transmission function Gm (s) of the response of the reference model of the driving torque and the transmission function Gm (s) of from the engine torque command value Te*' to the actual engine torque as an input of the engine basic torque command value Te*, the torque reference model value calculation unit 220 that calculates the torque reference model value Tme_ref by using the engine torque reference model value Te_ref and the motor torque reference model value Tm_ref, and the driving wheel rotation speed reference model value calculation unit 206 that calculates the driving wheel rotation speed reference model value ωd_ref by using the reference model value Tme_ref are provided, which the driving wheel rotation speed reference model value ωd_ref generated by the engine torque can be more accurately calculated. Accordingly, in running conditions, as shown in a dotted line A of FIG. 24, where a basic torque command value is distributed only to the engine 2, when the engine torque command value Te* is changed stepwise, an inherent delay component of the engine can not be corrected by the torque correction value calculation unit 207 (feedback). As a result, the vibrations can be restricted without overshooting.

On the contrary, in the earlier art, as shown in a dotted line of the figure, a regular acceleration component caused by an engine is generated in a deviation with the driving wheel rotation speed detection value ωd, and the regular acceleration component has no function with respect to a vibration restriction, which provides an inappropriate influence on a regular driving torque.

On the other hand, the present invention can achieve a good vibration control performance without generation of regular deviations of the driving torque command value.

And by approximating the engine transmission characteristic Ge (s) with a first delay of the above equation (104) and the waste time model, a response characteristic of an engine torque can be improved, taking into account a response delay of the engine 2 (fuel supply delay in an intake system).

And as shown in FIG. 18 and FIG. 19, time constant τ e of the engine delay model is set to be smaller as the engine rotation speed or the final engine torque command value Te*' is larger, and thereby a vibration restriction performance can be improved regardless of operation conditions of the engine 2.

Further, by setting the time constant τ e of the engine delay model as smaller than a delay time of an actual engine, the torque correction value calculation unit 107 (feedback) operates so that the engine delay corresponds to the time constant and the waste time set at a model, which can reduce the engine delay, accordingly to restrict the vibrations and improve a response of the driving torque.

Figure 24:
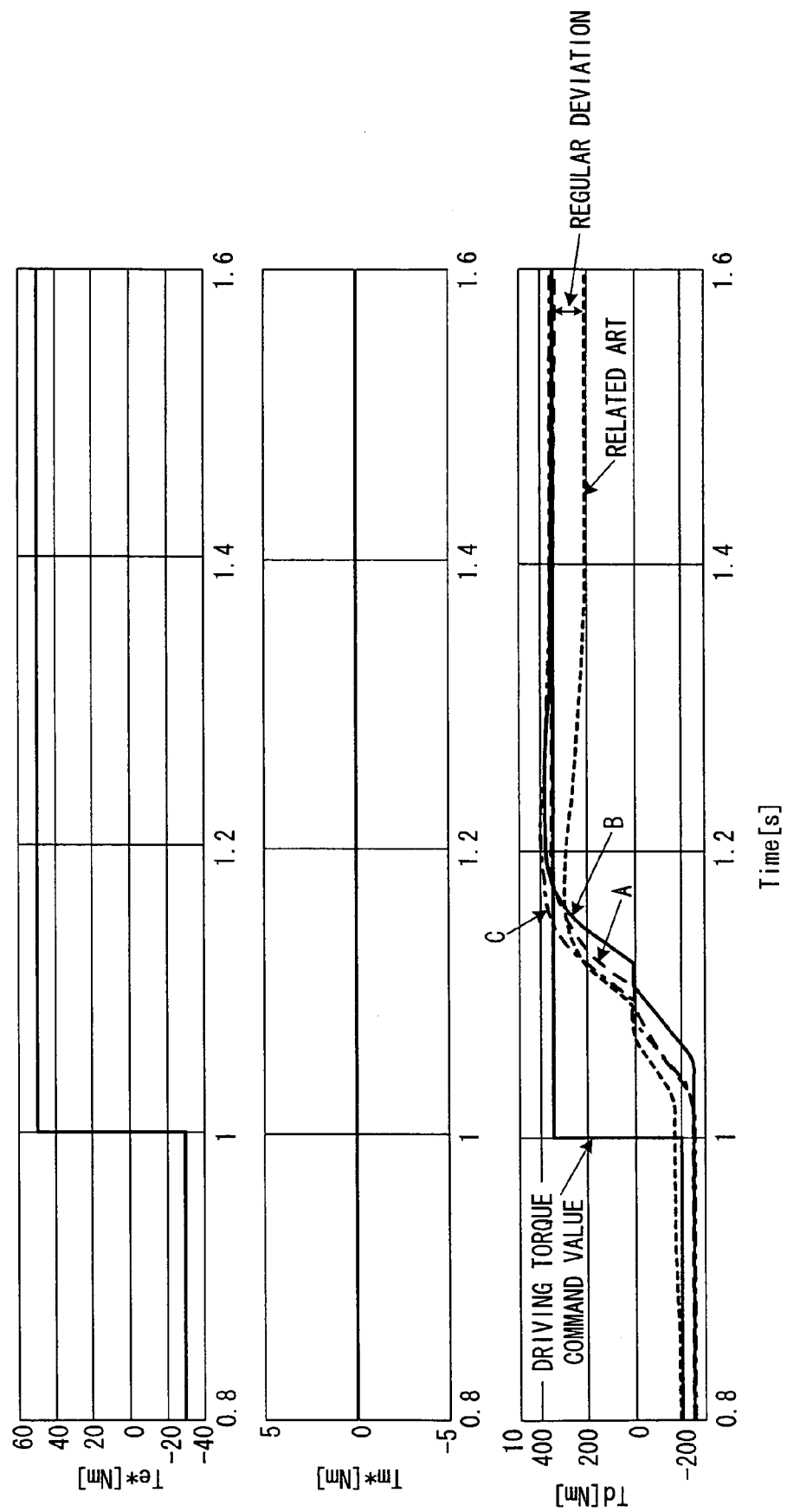
FIG. 24 is a graph showing a relation of time with an engine torque command value, a motor torque command value, and a driving torque command value.
Figure 30:
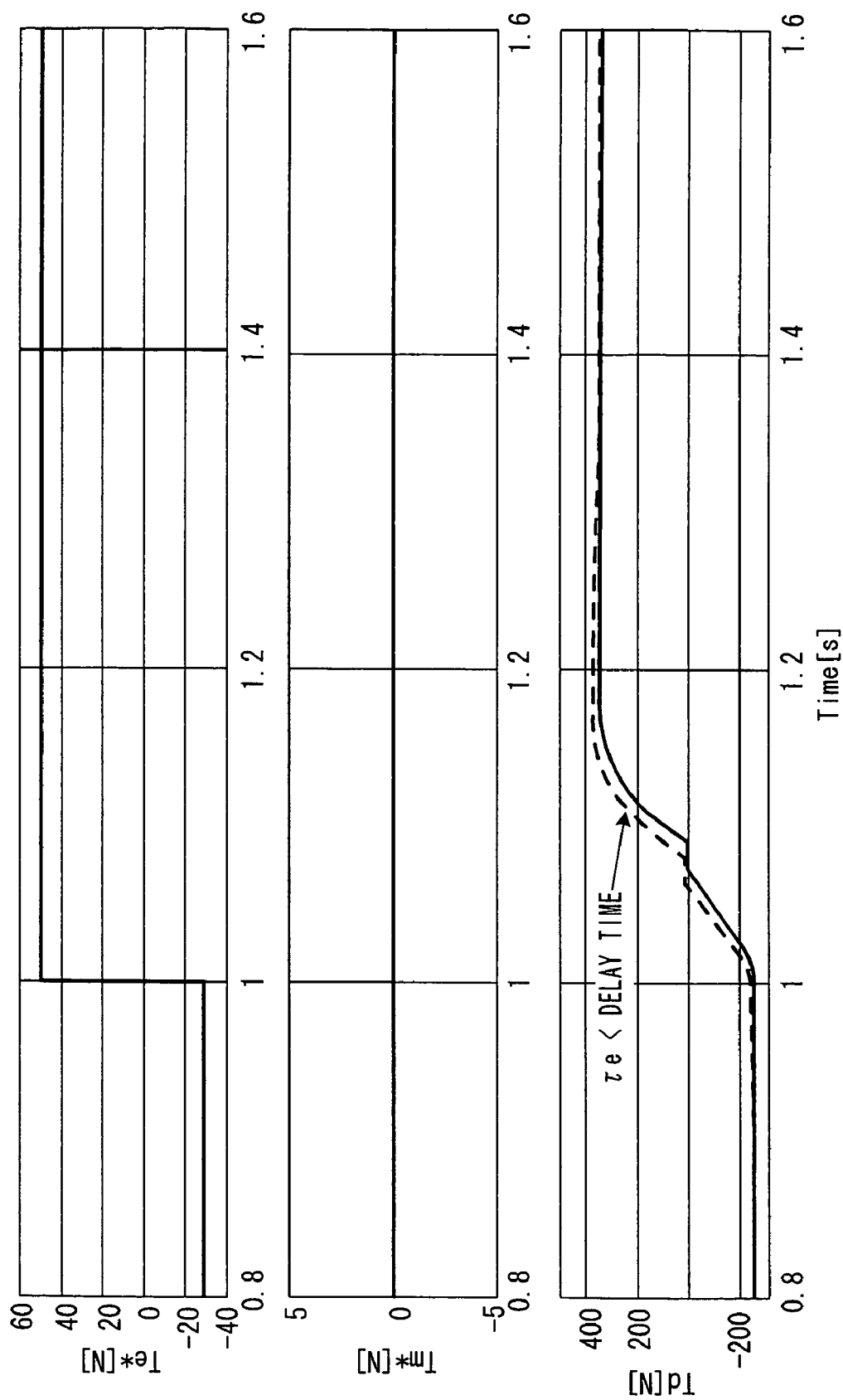
FIG. 30 is a graph showing a relation of time with an engine torque command value, motor torque command values, and a driving torque command value.

For instance, in running conditions, as shown in FIG. 30, where a basic torque command value is distributed only to the engine 2 in the same way with FIG. 24, when the engine torque command value Te* is changed stepwise, the response performance can be improved as compared to a solid line, as shown in a dotted line of the figure.

And as shown in the above equation (101), a phase compensation is made to the engine basic torque command value Te* from the engine phase compensation unit 201 that is a product of a reverse system of a transmission characteristic Gp' (s) of the driving torque to the torque that the drive source generates, and a transmission characteristic Gm (s) (non-vibration model) of the response of the reference model of the driving torque that a designer desires, to calculate the engine torque command value Te_FF, as well as the motor phase compensation unit 202 that calculates the motor torque command value Tm_FF by making the phase compensation to the motor torque command value Tm*' by using the motor phase compensation transmission characteristic Wm (s) having a characteristic identical to that of the engine phase compensation unit 201 is disposed, and a final torque command calculation unit 112 that calculates a final motor torque command value Te*' by performing a correction to a correction value Tm_FF of the motor torque command value by a correction value Tm_FB of the motor torque command value from the torque correction value calculation unit 107 is provided. Thereby a feed forward compensation is in advance made to the basic torque command value, which causes an improvement of the follow-up characteristic to a response of reference model. For instance, as shown in one dashed line c of FIG. 24, generation of a regular deviation can be prevented with a higher response performance.

Further, a response of reference model Gm (s) is set as being in common with the engine phase compensation unit 201, the motor phase compensation unit 202, and the torque reference model value calculation unit 220, which causes an decrease of an amount to be corrected by feedback compensation, thereby to improve the follow-up characteristic to a response of reference model.

Figure 25:
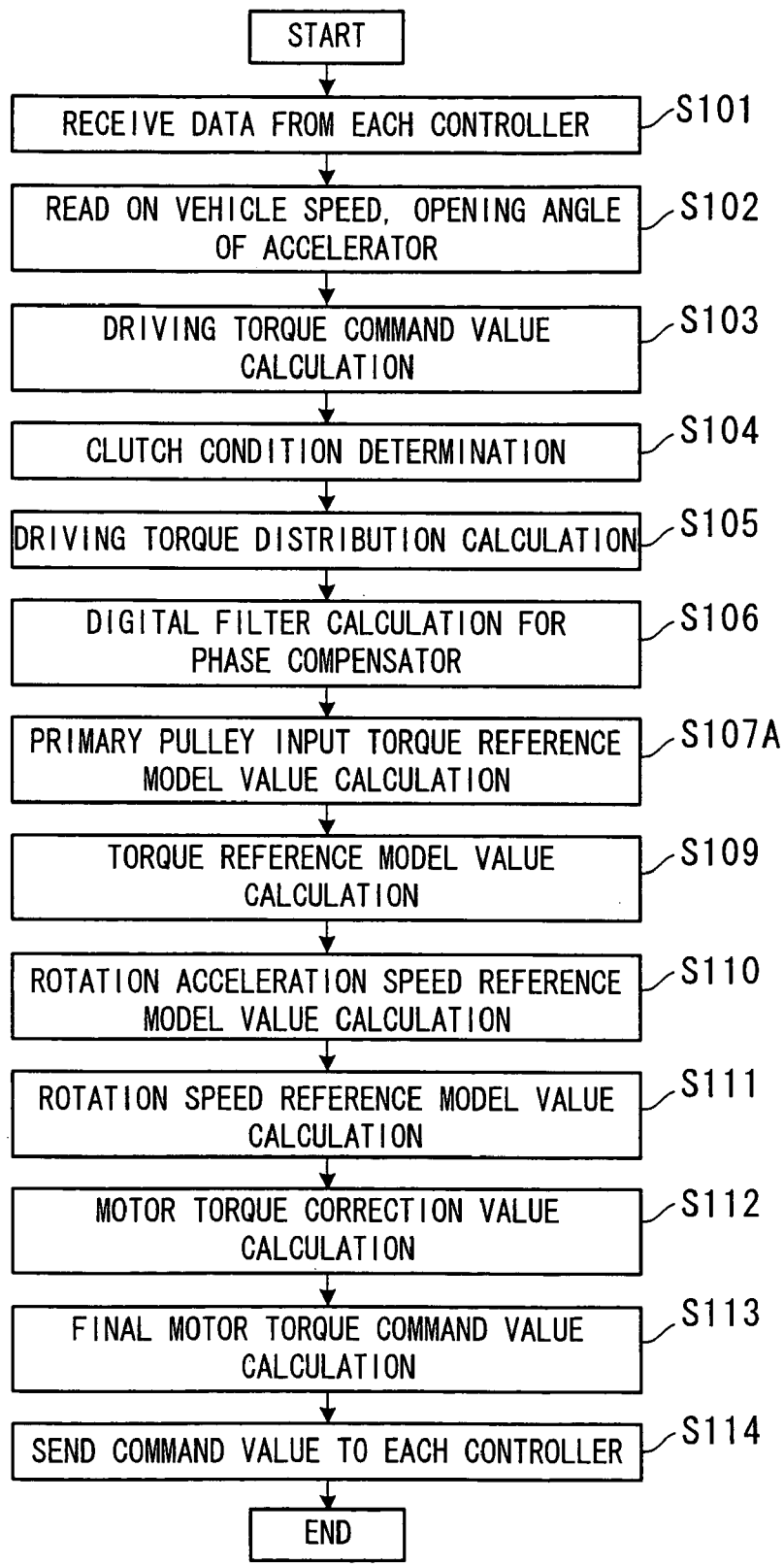
FIG. 25 shows a fourth embodiment and is a flow chart showing one example of control performed in an integrated controller.
Figure 26:
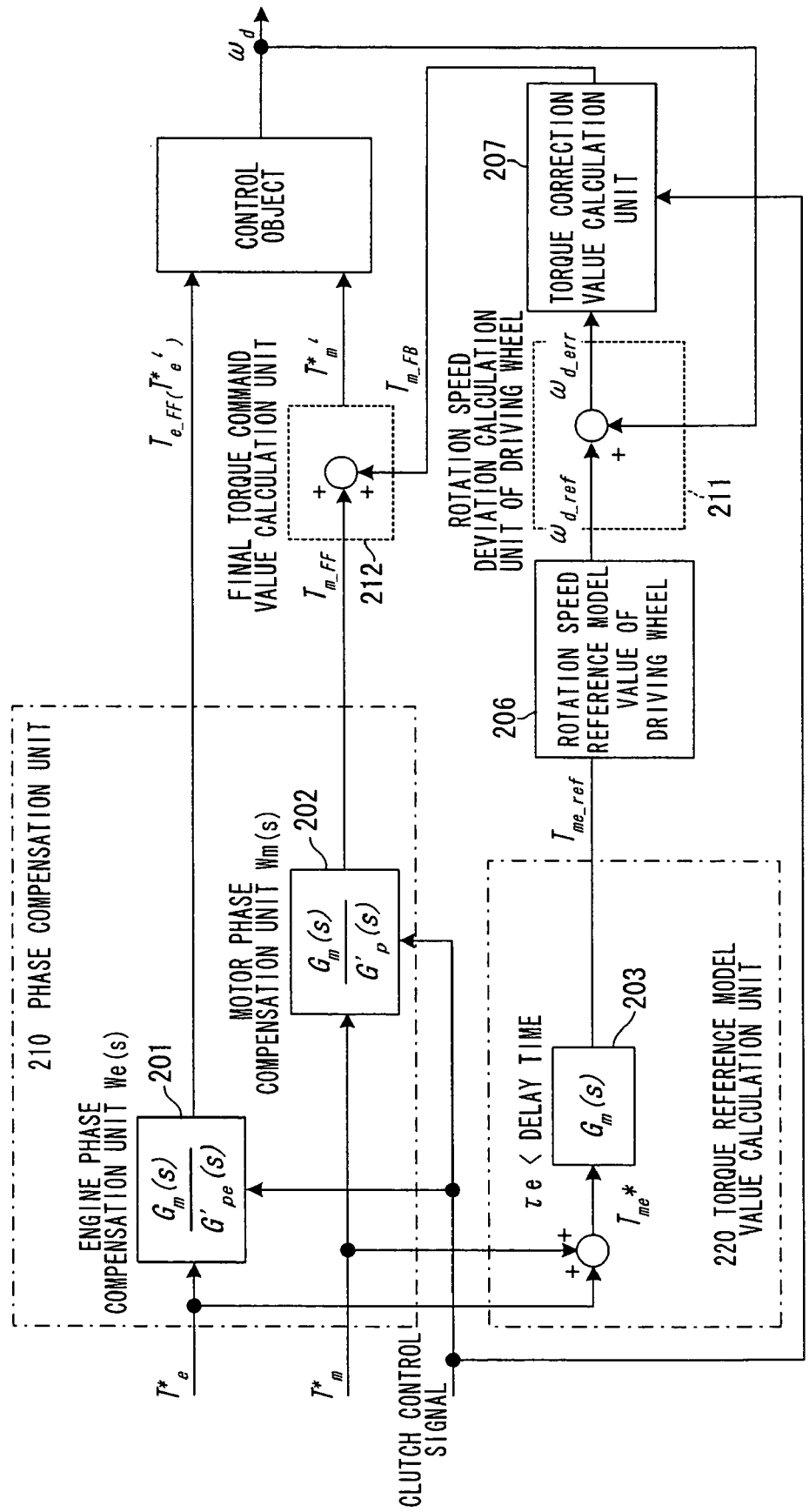
FIG. 26 is a control block diagram showing a part of an integrated controller.

FIG. 25 and FIG. 26 further show different embodiments where FIG. 25 shows one example of a control to be performed in the integrated controller 10 and replaces Step S107 and Step S108 of a flow chart in FIG. 15 for Step S107A, and a control block diagram in FIG. 25 alters the engine phase compensation unit 201 and the torque reference model value calculation unit 220 of the control block diagram in FIG. 23 showing the former embodiment.

Firstly, in a flow chart of FIG. 25, explanations of Steps s101-S105, and Steps S109-S14 are omitted because they are identical to those in the above embodiment.

Until Step S105, the processing identical to the above is performed and thereafter, at Step S106 a phase compensation is made to the engine torque command value Te* and the motor torque command value Tm* based upon the phase compensation unit 220, to calculate the engine torque command value Te_FF and the motor torque command value Tm_FF.

Herein a transmission characteristic We (s) of the engine phase compensation unit 201' (refer to FIG. 26), as shown in the following equation (112), is a product of a reverse system of the transmission characteristic Gpe' (s) of the driving torque to the final engine torque command value Te_FF, and the transmission characteristic Gm (s) (non-vibration model) of the response of the reference model of the driving torque.

$$W_e(s) = \frac{G_m(s)}{G'_{pe}(s)} = \frac{s^2 + 2\xi_{pe}\omega_{pe}s + \omega_{pe}^2}{s^2 + 2\xi_m\omega_m s + \omega_m^2} \cdot \frac{\omega_m^2}{\omega_p^2} \qquad (112)$$

The reverse system Gpe' (s) corresponds closer to an actual value by setting the phase compensation unit 210, taking into account even the engine response delay, thereby to improve a vibration restriction performance due to the phase compensation.

And at Step S107 an input torque command value Tme* of a primary pulley 5p is calculated according to the following equations (113), (114).

1) In case a clutch is engaged (parallel running)

$$Tme^* = Tm^* + Te^* \qquad (113)$$

2) In case a clutch is disengaged (series running)

$$Tme^* = Tm^* \qquad (114)$$

Next, at Step S109, a torque reference model value Tme_ref is calculated according to the following equation (115) from an input of a primary pulley input torque command value Tme*.

$$Tm\_ref = Gm(s) \cdot Tm^* \quad (115)$$

However, the same explanations after Step S110 are omitted because of the same processing with the above-described.

Next, a block diagram in FIG. 26 differs from the phase compensation unit 210 of the above embodiment in that the engine phase compensation unit 201' of the phase compensation unit 210 is the transmission characteristic Gpe' (s) of the driving torque, and further, in that the torque reference model value calculation unit 220 is only the transmission characteristic Gm (s) (non-vibration model) of the response of the reference model of the driving torque.

Thus in the case of setting the transmission characteristic of the engine phase compensation unit 201' a constant (G' pe(s)) of the phase compensation unit 201', taking into account the engine delay characteristic is set. Accordingly a physical delay characteristic of the engine is in advance taken into account for the transmission characteristic Gp' (s) of a control object in the engine phase compensation unit 201', and as a result a vibration restriction performance and a control response performance by a phase compensation (feedforward) are improved.

Figure 27:
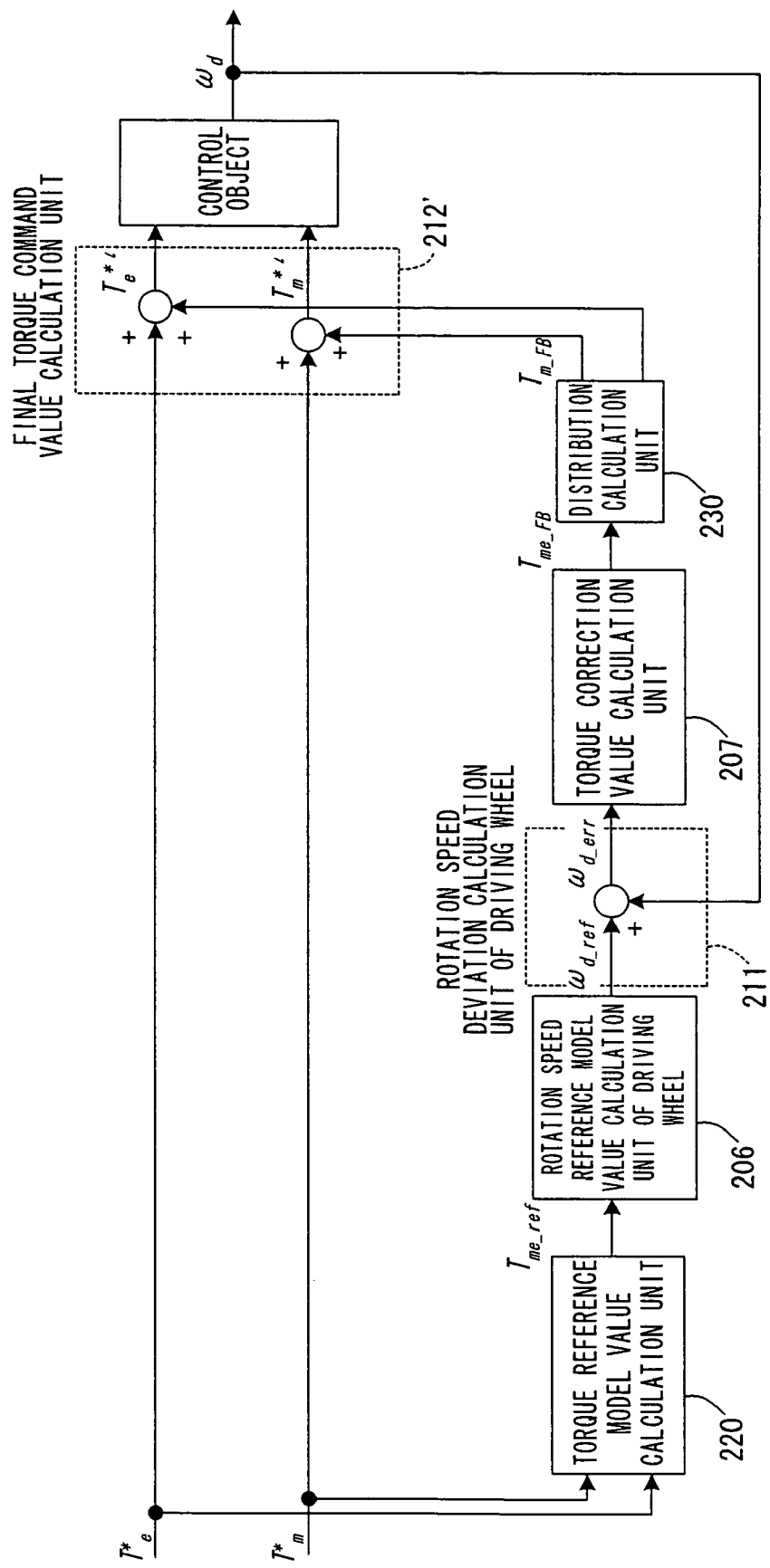
FIG. 27 shows a fifth embodiment and is a control block diagram showing a part of an integrated controller.
Figure 28:
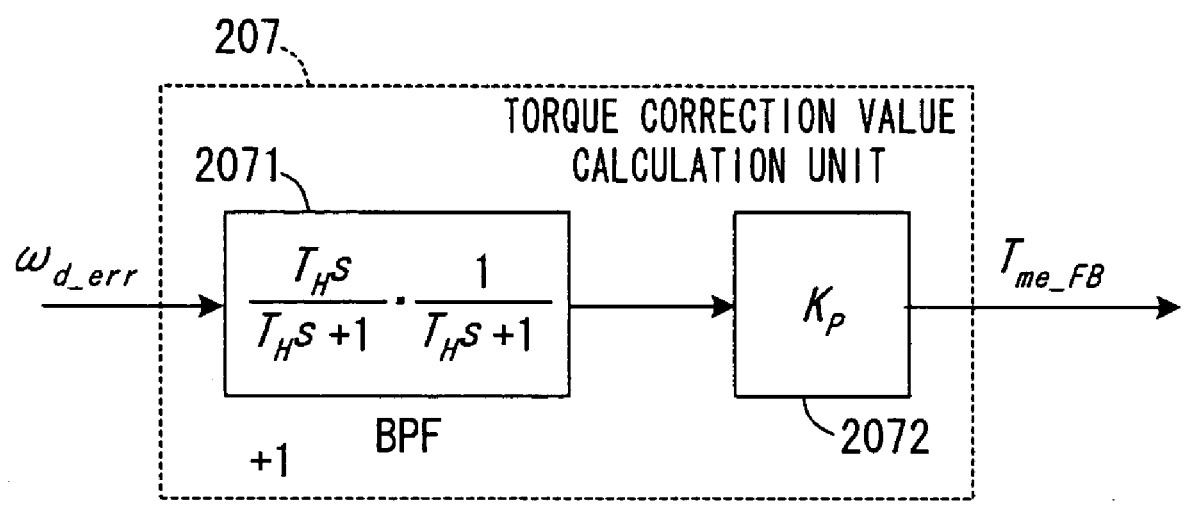
FIG. 28 is a control block diagram of a torque correction value calculation unit in the same as the above.

FIG. 27 and FIG. 28 further show different embodiments.

These embodiments omit the phase compensation unit 210 of the block diagram shown in FIG. 23, and on the other hand, distributes the correction value Tme_FB from the torque correction value calculation unit 207 to the engine basic torque command value Te* and the motor basic torque command value Tm*.

FIG. 27 is a block diagram showing a key portion of the integrated controller 10 and FIG. 28 is a block diagram showing a torque correction value calculation unit 207. Components identical to those in the first embodiment are referred to as the same numbers and the explanation thereof is omitted.

The torque correction value calculation unit 207 calculates a correction value Tme_FB of the torque command value from the deviation ωd_err, which is distributed according to the following equations (116) (117) to the engine basic torque command value Te* and the motor basic torque command value Tm*.

$$Tm\_FB = k \cdot Tm\_FB \quad (116)$$

$$Te\_FB = (1-k) \cdot Tme\_FB \quad (117)$$

Herein k is a distribution rate (0≦k≦1) and a setting method of the rate is described before, and, for instance, the rate is set based upon a vehicle operating condition amount such as a battery charge amount SOC.

The correction value Te_FB of the engine torque command value and the correction value Tm_FB of the motor torque command value from the correction value Tme_FB of the torque command value are calculated by a distribution rate k, and the engine torque command value Te_FF and the motor torque command value Tm_FF are corrected by using these torque correction values, to output the final engine torque command value Te*' and the final motor torque command value Tm*' to a control object (final torque command value calculation unit 212').

The torque correction value calculation unit 207 is the same as that in the embodiment and, as shown in FIG. 28, includes a band pass filter 2071 and a proportional gain Kp 2072 shown in the above equation (110) and calculates the correction value Tme_FB of the torque command value from the deviation ωd_err.

According to the embodiment as described above, a vibration restriction control apparatus for a hybrid vehicle that outputs a torque from at least two power sources (engine 2 and alternating current synchronous motor 1) to a driving wheel through a power transmission mechanism is provided with an engine 2 and a motor 1 as power sources, a basic torque command value calculation unit that calculates an engine basic torque command value Te* and a motor basic torque command value Tm* based upon an acceleration demand, a torque reference model value calculation unit 220 that calculates a torque reference model value Tme_ref from inputs of the engine basic torque command value Te* and the motor basic torque command value Tm*, a driving wheel rotation speed reference model value calculation unit 206 that calculates a driving wheel (or drive shaft) rotation speed reference model value ωd_ref from the torque reference model value Tme_ref, a driving wheel rotation speed deviation calculation unit 211 that calculates a deviation ωd_err between the driving wheel rotation speed reference model value ωd_ref and a driving wheel rotation speed detection value ωd, a torque correction value calculation unit 220 that extracts only a vibration frequency component from the deviation ωd_err to calculate a correction value Tme_FB of the torque command value, a torque correction value distribution calculation unit 230 that distributes a correction value Te_FB of an engine torque command value and a correction value Tm_FB of a motor torque command value by using the correction value Tme_FB of the torque command value, and a final torque command value calculation unit 212' that calculates a final engine torque command value Te*' and a final motor torque command value Tm*' by correcting an engine basic torque command value Te* and a motor basic torque command value Tm* by using the correction value Te_FB of the engine torque command value and the correction value Tm_FB of the motor torque command value, wherein a torque reference model value Tme_ref is calculated by inputting a basic torque command value of a plurality of power sources (engine and motor) to the torque reference model value calculation unit 220.

Accordingly by changing an input to the torque reference model value calculation unit 220 in response to a running condition (for instance, engagement condition of the electromagnetic clutch 3), for instance, in the case of the running condition (a basic torque command value is distributed only to the engine) as shown in FIG. 24, the driving wheel rotation speed reference model value ωd_ref is calculated by using the engine basic torque command value Te* and the motor basic torque command value Tm*. Therefore, as shown in a solid line B of the figure, the control can be performed without generating a component such as a regular acceleration component caused by an engine in the deviation with the driving wheel rotation speed detection value ωd, the component being not related to vibration restriction. Accordingly a good vibration restriction performance can be achieved without exerting an influence on the regular driving torque regardless of running conditions.

And the torque correction value calculation unit 220 extracts only the vibration frequency component through the band pass filter (BPF) as shown in the above equation (110) and thereafter calculates the correction value of the torque command value by using the result (proportional element) obtained by multiplying the proportional gain Kp by the component. Thereby the vibration restriction control can be performed without generating the component that is not related to the vibration restriction.

Figure 29:
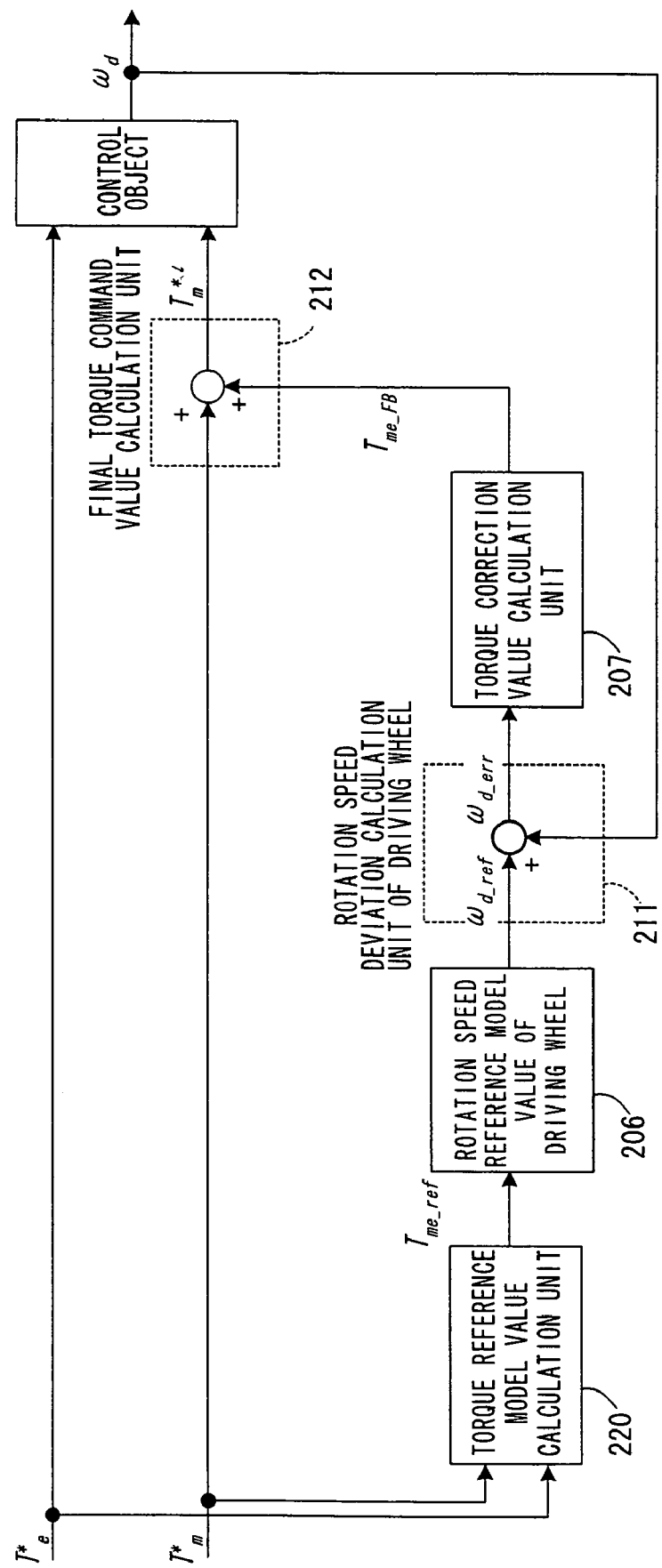
FIG. 29 shows a sixth embodiment and is a control block diagram showing a part of an integrated controller.

FIG. 29 shows a further different embodiment of the present invention where in the embodiment shown in FIG. 23 the construction of the phase compensation unit 210 of the block diagram is omitted and the point that the correction value Tme_FB from the torque correction value calculation unit 207 is feed-backed only to the motor basic torque command value Tm* is the same with the embodiment.

In this case, by performing a feedback correction only to the motor torque command value Tm_FF and by using an alternating current synchronous motor 1 with a higher response performance than an engine 2 as a control object for vibration absorption, the driving torque can be accurately controlled and the response is fast, providing a better vibration restriction performance. However, when the feedback to the engine 2 is performed, an integral value is accumulated in an integral element due to a low response, causing instability of a control system. Accordingly the feedback is performed only to the motor 1, avoiding unnecessary accumulation of the integral value.

This application claims priority to Japanese Patent Application No. 2003-314246 and Japanese Patent Application No.2004-131446. The entire disclosures of Japanese Patent Application No. 2003-314246 (filed on Sep. 5, 2003) and Japanese Patent Application No. 2004-131446 (filed on Apr. 27, 2004) are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A driving force control apparatus for a vehicle, wherein the vehicle comprises at least one power source, a drive mechanism connected to the one power source, and a driving wheel to which a torque to be outputted from the one power source is transmitted through the drive mechanism, the apparatus comprising:
a first sensor that detects an output command supplied to the one power source;
a second sensor that detects an operating condition amount of the vehicle; and
a controller programmed to:
calculate a basic command value of an output of the one power source based upon the output command to the one power source for the vehicle from the first sensor;
calculate a reference model command value based upon the basic command value and a transmission characteristic of a response of reference model;
calculate a correction value based upon a deviation between the reference model command value and a predetermined frequency component corresponding to a vibration of a vehicle driving system extracted out of the operating condition amount of the vehicle from the second sensor;
calculate a target command value based upon the basic command value and the correction value; and
control the output of the one power source based upon the target command value.

2. The driving force control apparatus as defined in claim 1, wherein
the controller calculates a phase compensation value for dynamic characteristic compensation based upon the basic command value, and calculates the target command value based upon the phase compensation value and the correction value.

3. The driving force control apparatus as defined in claim 2, wherein
the controller calculates a reverse system of a transmission characteristic Gp (s) to a driving wheel torque with respect to the operating condition amount, and a response of reference model Gm (s) to the driving wheel torque with respect to the operating condition amount for the dynamic characteristic compensation.

4. The driving force control apparatus as defined in claim 3, wherein
the controller calculates the response of the reference model Gm (s) in accordance with the operating condition amount for the dynamic characteristic compensation, wherein the response of the reference model Gm (s) corresponds to a response of reference model Gm (s) of the reference model command value calculation.

5. The driving force control apparatus as defined in claim 1, wherein
the controller calculates:
a torque reference model value based upon a response of reference model from an input of the basic command value; and
a rotation speed reference model value of the driving wheel from the torque reference model value;
extracts a predetermined frequency component corresponding to a vibration of the vehicle drive system from a rotation speed value of the driving wheel;
0013 calculates a torque correction value from a deviation between the rotation speed reference model value and the frequency component; and
0014 corrects the basic command value based upon the torque correction value.

6. The driving force control apparatus as defined in claim 5, wherein
the controller extracts the predetermined frequency component corresponding to the vibration of the vehicle drive system through a band pass filter, and thereafter calculates the torque correction value at least by multiplying the predetermined frequency component by a proportional gain.

7. The driving force control apparatus as defined in claim 1, wherein
the controller calculates a torque reference model based upon a response of reference model from an input of the basic command value,
calculates a rotation acceleration speed reference model value of the driving wheel from the torque reference model value,
estimates a rotation acceleration speed value of the driving wheel through a band pass filter from an input of a rotation speed value of the driving wheel,
performs a low pass filtering to the rotation acceleration speed reference model value of the driving wheel by using a low pass filter that allows only for a delay element component of the band pass filter, to calculate a final rotation acceleration speed reference model value of the driving wheel,
calculates a torque correction value based upon a deviation between the final rotation acceleration speed reference model value and the rotation acceleration speed reference model estimation value of the driving wheel, and corrects the basic command value based upon the torque correction value.

8. The driving force apparatus as defined in claim 7, wherein the band pass filter includes a transmission characteristic to extract only the predetermined frequency component corresponding to the vibration of the vehicle drive system.

9. The driving force control apparatus as defined in claim 7, wherein the band pass filter $$G_{BPF}(s) = \frac{\tau_H s}{(\tau_H s + 1)(\tau_L s + 1)}$$

and the low pass filter $$G_{LPF}(s) = \frac{1}{(\tau_H s + 1)(\tau_L s + 1)},$$

wherein each of constants $\tau H$, $\tau L$ is set in accordance with the frequency component, and the torque correction value is calculated by use of at least a proportional gain to the deviation between the final rotation acceleration speed reference model value and the rotation acceleration speed reference model estimation value of the driving wheel.

10. The driving force control apparatus as defined in claim 1, wherein the power source comprises an engine or a motor, the drive mechanism comprises a transmission connected to the engine or the motor, and the controller changes the predetermined frequency component corresponding to the vibration of the vehicle drive system based upon a gear ratio of the transmission.

11. The driving force control apparatus as defined in claim 10, wherein the controller sets the predetermined frequency component to be narrow in band width in the case of a low vibration frequency and to be wide in band width in the case of a high vibration frequency.

12. A driving force control apparatus for a vehicle, wherein the vehicle comprises a first power source, a second power source having a response performance different from the first power source, a drive mechanism connected to at least one of the first and the second power source, and a driving wheel to which a torque to be outputted from at least the one of the first and the second power source is transmitted through the drive mechanism, the apparatus comprising:

a first sensor that detects an output command supplied to at least the one of the first and the second power source;

a second sensor that detects an operating condition amount of a vehicle; and a controller programmed to:

calculate as a basic command value of outputs to the first power source and the second power source a first basic command value and a second basic command value based upon based upon the output command from the first sensor;

calculate a reference model command value based upon the basic command value and a transmission characteristic of a response of reference model;

calculate a correction value based upon a deviation between the reference model command value and a predetermined frequency component corresponding to a vibration of a vehicle driving system extracted out of the operating condition amount from the second sensor;

calculate a target command value by correcting at least one of the first and the second basic command value based upon the correction value; and control the outputs of the first and the second power source based upon the target command value.

13. The driving force control apparatus as defined in claim 12, wherein the controller calculates:

a torque reference model value based upon the response of the reference model from inputs of the first and the second basic command value; and a rotation speed reference model value of the driving wheel from the torque reference value;

calculates a deviation between the rotation speed reference model value of the driving wheel and the rotation speed value thereof;

extracts a predetermined frequency component corresponding to a vibration of the vehicle drive system from the deviation;

calculates a torque correction value based upon the deviation and the vibration frequency component; and corrects at least one of the first and the second basic command value based upon torque correction value.

14. The driving force control apparatus as defined in claim 13, wherein the controller extracts only the predetermined frequency component corresponding to the vibration of the vehicle drive system through a band pass filter, and thereafter calculates the torque correction value at least by multiplying the predetermined frequency component by a proportional gain.

15. The driving force control apparatus as defined in claim 12, wherein the first power source comprises an engine, and the second power source comprises a motor, wherein the controller corrects only the second basic command value to the motor based upon the correction value.

16. The driving force control apparatus as defined in claim 13, wherein the controller calculates a first phase compensation amount from a product of a reverse system of a transmission characteristic G p' (s) to a driving wheel torque with respect to a torque generated by the first power source, and a response of reference model Gm (s) to a predetermined driving wheel torque, calculates a first torque command value by carrying out a phase compensation to the first basic command value based upon the first phase compensation amount, calculates a second phase compensation amount from a transmission characteristic Wm (s) to the driving wheel torque with respect to a torque generated by the second power source based upon a characteristic equal to the first phase compensation amount, calculates a second torque command value by carrying out a phase compensation to the second basic command value based upon the second phase compensation amount, calculates a final first torque command value by correcting the first torque command value based upon the torque correction value, and calculates a final second torque command value by correcting the second torque command value based upon the torque correction value.

17. The driving force control apparatus as defined in claim 16, wherein the controller performs the calculations of the first phase compensation and the second phase compensation, and the calculation of the torque reference model with the response of the reference model Gm (s) to the driving wheel torque in common there between.

18. The driving force control apparatus as defined in claim 16, wherein the controller calculates a first torque reference model value based upon the response of the reference model Gm (s) to the driving wheel torque, and a transmission characteristic Ge (s) from the final first torque command value to an actual torque of the first power source as an input of the first basic command value, calculates a second torque reference model value based upon the response of the reference model Gm (s) to the driving wheel torque as an input of the second basic command value, calculates a torque reference model value based upon the first torque reference model value and the second torque reference model value, and calculates a rotation speed reference model value of the driving wheel based upon the torque reference model value.

19. The driving force control apparatus as defined in claim 18, wherein the first power source comprises an engine and the controller approximates the transmission characteristic Ge (s) with a first delay model and a waste time model.

20. The driving force control apparatus as defined in claim 19, wherein the controller sets time constant $\tau$ e of the first delay model to be smaller as the engine rotation speed or the final first torque command value becomes larger.

21. The driving force control apparatus as defined in claim 20, wherein the controller sets time constant $\tau$ e of the first delay model to be smaller than an actual engine delay time.

22. The driving force control apparatus as defined in claim 16, wherein the controller sets a constant of the transmission characteristic Gp' (s), taking into account the delay characteristic of the first power source for the first phase compensation.

* * * * *